United States Patent [19]

Ando

[11] Patent Number: 4,839,824

[45] Date of Patent: Jun. 13, 1989

[54] APPARATUS FOR MEASURING AN OBJECT BASED ON SPATIO-TEMPORALLY DERIVATED IMAGE SIGNALS

[75] Inventor: Shigeru Ando, Tokyo, Japan

[73] Assignee: Suncom Co., Ltd., Kanagawa, Japan

[21] Appl. No.: 76,436

[22] Filed: Jul. 21, 1987

[30] Foreign Application Priority Data

Jul. 22, 1986 [JP] Japan .................... 61-170882

[51] Int. Cl.⁴ .................................. H04N 7/18
[52] U.S. Cl. .................... 364/516; 364/562; 364/900; 358/107
[58] Field of Search ............ 364/516, 560, 561, 562, 364/900, 555, 565; 358/96, 105, 107; 382/65, 41, 49; 901/47; 378/901

[56] References Cited

U.S. PATENT DOCUMENTS

| | | | |
|---|---|---|---|
| 4,063,073 | 12/1977 | Strayer | 364/516 |
| 4,103,998 | 8/1978 | Nakazawa et al. | 364/490 |
| 4,320,415 | 3/1982 | Jones | 364/555 |
| 4,322,716 | 3/1982 | Sternberg | 364/900 |
| 4,449,144 | 5/1984 | Suzuki et al. | 364/565 |
| 4,614,430 | 9/1986 | Hara et al. | 382/8 |
| 4,635,292 | 1/1987 | Mori et al. | 364/900 |
| 4,679,076 | 7/1987 | Vikterlöf et al. | 358/107 |
| 4,679,077 | 7/1987 | Yuasa et al. | 358/105 |
| 4,723,221 | 2/1988 | Matsuura et al. | 364/490 |
| 4,731,650 | 3/1988 | Hadfield et al. | 358/107 |

Primary Examiner—Parshotam S. Lall
Assistant Examiner—Ellis B. Ramirez
Attorney, Agent, or Firm—Cushman, Darby & Cushman

[57] ABSTRACT

A measuring apparatus which makes use of spatio-temporal derivative method has a sensor which may be a pair of cameras for picking up images of a three-dimensional object, computing unit for processing the signals by applying spatio-temporal derivative method to the signals representing the images so as to determine physical amounts of the object such as heights of different regions on an object and self-estimation values such as values indicative of validity of the height data, judging unit for judging the validity of the physical amounts determined by the computing means on the basis of the self-estimation values, and control unit for varying, when there is any physical amount having low validity, the measuring condition of the sensor such as the distance between the sensor and the object so as to enable the sensor to obtain the signals again, while restarting the computing means and the judging means. The final measuring result such as the three-dimensional image can be formed by utilizing only the valid data obtained with a plurality of measuring conditions.

11 Claims, 32 Drawing Sheets

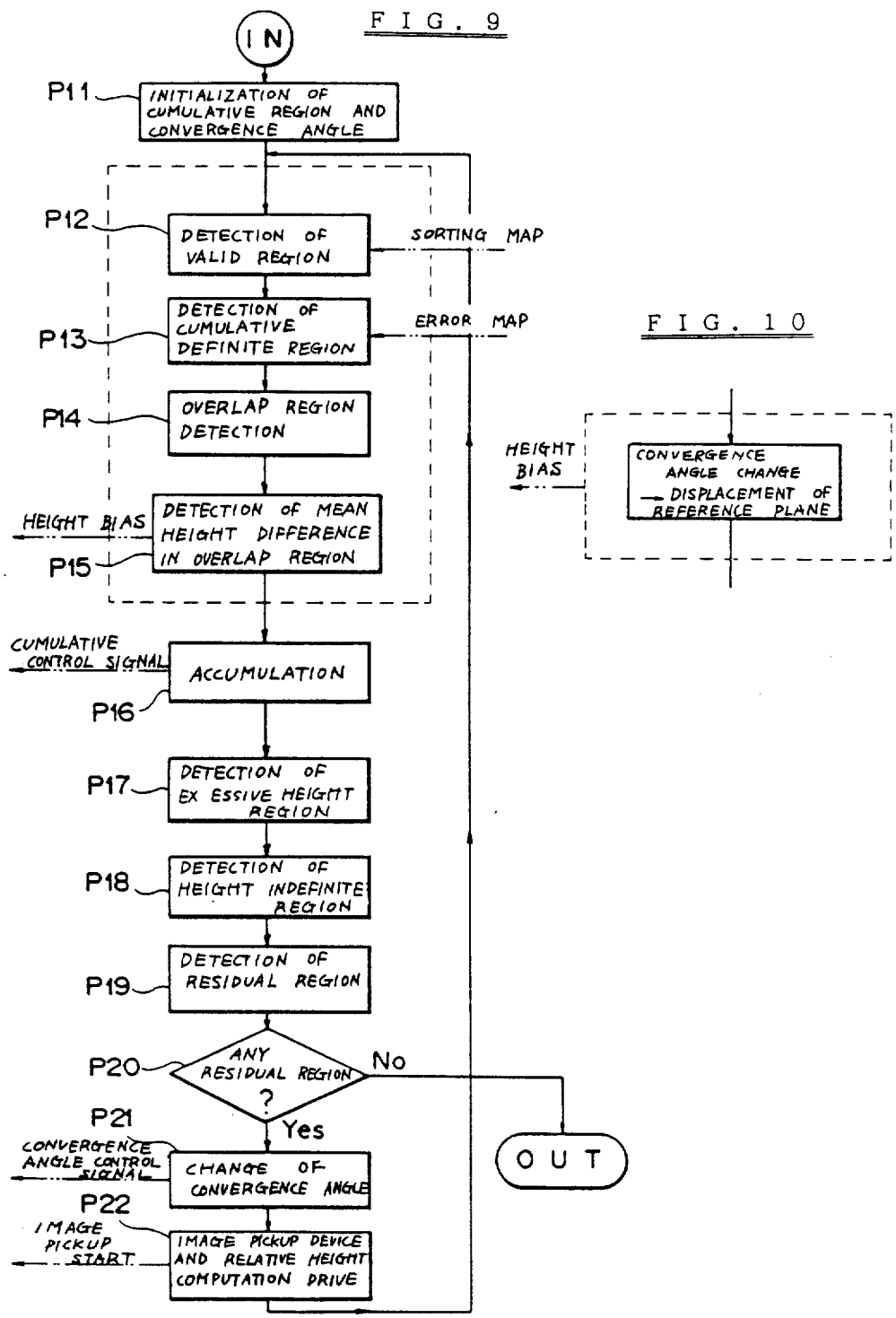

F I G. 1 1 B
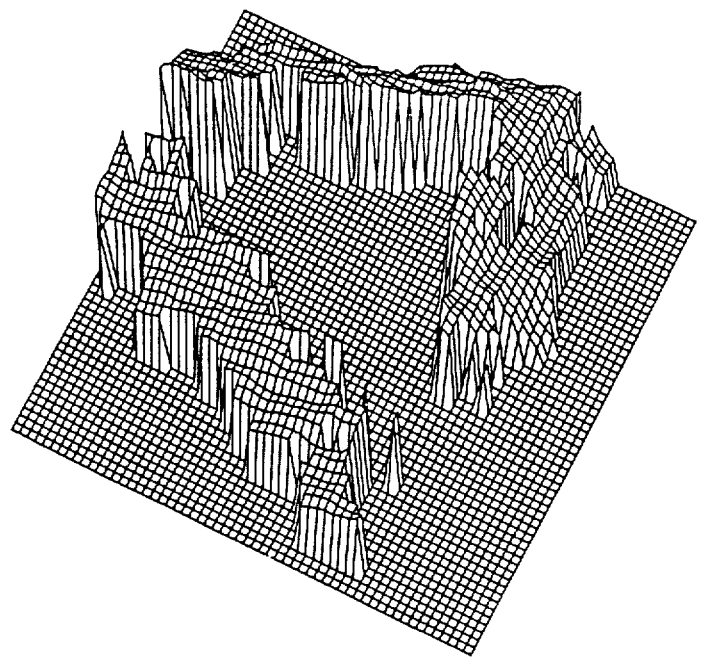

F I G . 1 1 C
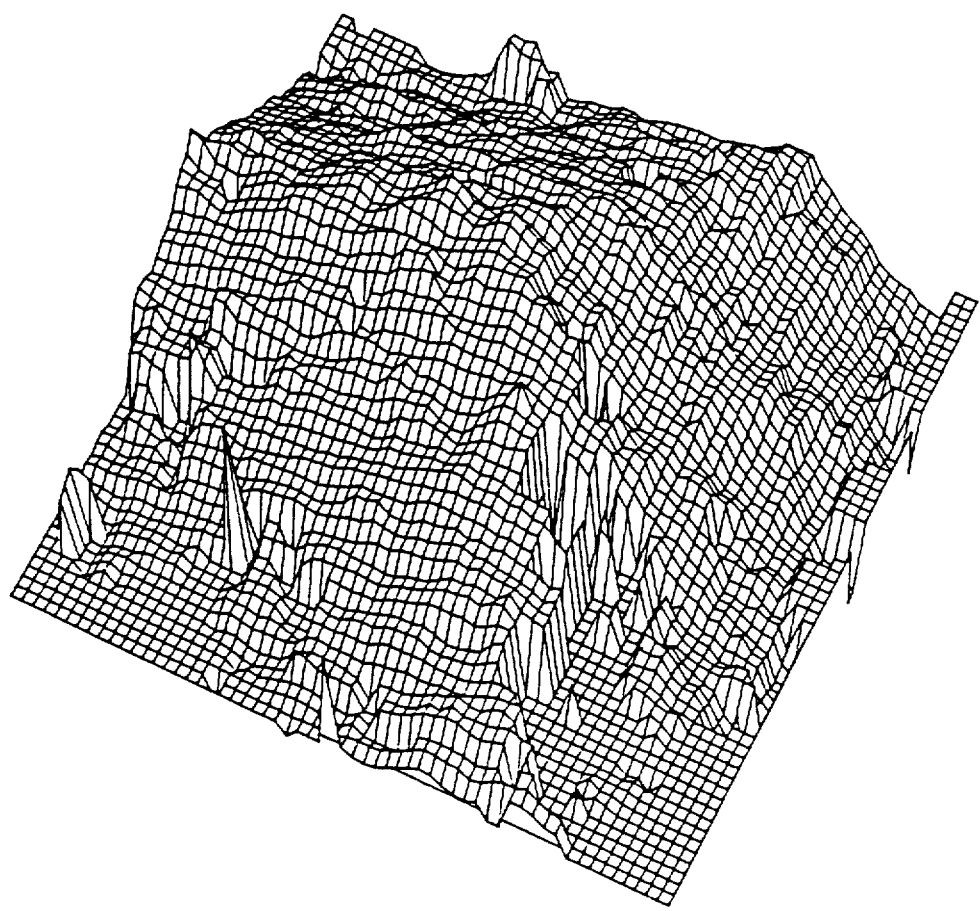

APPARATUS FOR MEASURING AN OBJECT BASED ON SPATIO-TEMPORALLY DERIVED IMAGE SIGNALS

BACKGROUND OF THE INVENTION

The present invention relates to a signal processing apparatus which is adapted for processing, by spatio-temporal derivative method, signals such as image or sound signals which are derived from a measuring object and which vary spatially and temporally. The invention also is concerned with a measuring apparatus which is adapted for detecting, from the result of the signal processing performed by the signal processing apparatus, data concerning the measuring object such as kinematic data or three-dimentional data or data concerning time difference which is used for the purpose of locating the source of a sound.

In recent years, studies and researches on computer vision have made a remarkable progress and various techniques have been proposed for detecting data concerning movement or three dimensional configuration from a series of images. In particular, the flow of image formed by projection of movement of a measuring object on a screen is referred to as "optical flow" and finds a spreading use in, for example, separation of an object from the background, determination of three-dimensional construction and positioning, and so forth. The techniques for determining an optical flow has a wide use not only in the field of computer vision but also in the field of pure pattern measurement. From this point of view, the known techniques are generally sorted into two types. One of these two types is a method known as correspondence search which is executed by repeating an operation for attaining correspondece between two successive images with respect to characteristic points wich are selected with a sufficiently high degree of density or resolution. This process is a complicated and uncertain method which is generaly called as "correspondence method". Various improvements such as hierarchy search method in which the resolution of image is progressively increased in a stepped manner, and introduction of various restricting conditions.

Another type of known techniques makes use of spatio-temporal derivative method. This technique was first utilized in detection of slight movement of TV images, and approaches have been conducted for the purpose of establishing a definite formula by employing Lagrange differentiation, as well as analytical approaches.

A system is assumed here which observes, by means of a solid-state image pickup device, an object moving along a plane. The velocity field of a preselected point (x,y) is represented by (u, v). It is also assumed that only the movement constitutes the factor of temporal change in the image. When two consecutive images $f_1(x,y)$ and $f_2(x,y)$ are observed with a time interval $\Delta t$, these two images locally meet the following condition.

$$f_2(x,y) = f_1(x - u\Delta t, y - v\Delta t) \quad (1)$$

Provided that the deviations $u\Delta t$ and $v\Delta t$ are small and locally approximate constants, the right side of the formula (1) can be Taylor-developed about the preselected point (x,y) as follows so that approximation is possible down to the term of first degree.

$$f_1(x - u\Delta t, y - v\Delta t) = f_1(x,y) - u\Delta t f_{1x}(x,y) - v\Delta t f_{1y}(x,y) \quad (2)$$

where, $f_{1x}(x,y)$ and $f_{1y}(x,y)$ represent, respectively, the x- and y-partial differentiations of $f_1(x,y)$.

By combining formulae (1) and (2), the following formula (3) is derived.

$$f_1(x,y) - f_2(x,y) \approx u\Delta t f_{1x}(x,y) + v\Delta t f_{1y}(x,y) \quad (3)$$

When both sides of this formula are divided by $-\Delta t$, the left side shows the time differentiation $f_{1t}(x,y)$. Since $f_{1x}(x,y)$ and $f_{1y}(x,y)$ are differentiations of field, they can be computed immediately on the basis of the image data and, hence, can be regarded as being known values. Thus, the formula (3) can be treated as a linear equation which includes unknowns u and v and employing $f_{1x}(x,y)$ and $f_{1y}(x,y)$ as scalars. This is the principle of spatio-temporal derivative method. Some methods are available for determining the velocity field by making use of this principle. Examples of such methods are:

(1) A method in which the movement is limited only to unidimensional movement; and (2) A method in which the smoothness of the velocity field is assumed and velocity field which minimizes the coarseness measure in a manner which is compatible with the condition of formula (3).

These methods, when employed in measurement, offer various advantages as follows:

(1) Plainness and high speed owing to fact that velocity distribution can be formed solely through arithmetic operation.

(2) No necessary for preparatory information concerning the object, i.e., wide adaptability and objectivity.

(3) High resolution.

(4) Less liable to be affected by pattern deformation and, hence, reduced risk for significant error, because of use of slight deviation of image.

The correspondence search type technique, however, suffers from the following disadvantage when used as a measuring method.

(1) There is a risk that a significant error is involved due to wrong correspondence.

(2) An impractically long time is required for the processing.

The first disadvantage (1) is serious and can hardly be overcome in ordinary measuring systems which, unlike the computer vision, do not employ introduction of preparatory knowledge or information.

On the other hand, the spatio-temporal derivative method tends to be affected by external noises and its application is undesirably restricted to the cases where the deviation is small.

These problems are encountered not only when the measuring object is a moving object also in the case where images of a stationary three-dimensional object are picked up by a pair of image pick-up devices disposed on both lateral sides of the object and a three-dimensional image is formed from the thus obtained pair of images. Such problems also are involved in locating the source of a sound by the time difference detection from a pair of acoustic signals obtained through a pair of microphones. The same applies also to various image processing methods such as those which employ ultrasonic wave, nuclear magnetic resonance, X-rays and so forth, as well as the optical image processing described above. For these reasons, the image processing by spatio-temporal derivative method, despite its various advantages, has not been put into practical use.

SUMMARY OF THE INVENTION

Accordingly, an object of the present invention is to provide a signal processing apparatus which is capable of measuring of evaluating the degree of effectiveness or validity of data acquired through spatio-temporal derivative method.

Another object of the present invention is to provide a measuring apparatus which has a function to measure or evaluate the degree of effectiveness or validity of data acquired through the spatio-temporal derivative method and, in the event that any data of low degree of effectiveness or validity is involved, a control is conducted to make it possible to obtain data of high degree of effectiveness or validity over the entire region of the measuring object.

To these end, according to one aspect of the present invention, there is provided a measuring apparatus making use of spatio-temporal derivative method comprising: sensor means for picking up signals representing data concerning an object to be measured; computing means for processing the signals by spatio-temporal derivative method so as to determine physical amounts of the object and self-estimation values; judging means for judging the validity of the physical amounts determined by the computing means on the basis of the self-estimation values; and control means for varying, when there is any physical amount having low validity, the measuring condition of the sensing means so as to enable the sensing means to obtain the signals again, while re-starting the computing means and the judging means.

These and other objects, features and advantages of the present invention will become clear from the following description of the preferred embodiments when the same is read in conjunction with the accompanying drawings.

BRIEF DESCRIPTION OF THE DRAWINGS

FIGS. 2A to 11G are illustrations of a first embodiment of the present invention applied to detection of a three-dimensional image, in which:

FIG. 2A is an illustration of the positional relationship between an image pickup device and an object as viewed from the upper side;

FIG. 3 is an illustration of the concept of vicinity size;

FIG. 4 is an illustration of the whole of the first embodiment of the present invention;

FIG. 5 is a perspective view of an image pick-up camera and an object;

FIG. 6 is a block diagram of a relative height/self-estimation computing section;

FIG. 7 is a flow chart illustrating the operation of an example of a relative height sorting section;

FIG. 8 is a block diagram of examples of a load height/load accumulating section and a height reproducing section;

FIG. 9 is a flow chart illustrating the operation of an example of self-decision/control logic section;

FIG. 10 is an illustration of another example of a process for computing height bias; and FIGS. 11A to 11G are illustrations of the results of experiments for extracting three-dimensional image.

FIGS. 12 to 17F are illustrations of a second embodiment of the invention which is applied to the detection of a moving image, in which:

FIG. 14 is a block diagram of a smoothing circuit;

FIG. 15 is a flow chart showing an example of a velocity vector sorting section;

FIG. 16 is a flow chart showing an example of a self-decision/control logic section; and FIGS. 17A to 17F are illustrations of results of experiments for detecting a moving image.

FIGS. 18 to 21 are illustrations of a third embodiment of the present invention applied to time difference detection which is necessary in a sound source localizing process, in which:

FIG. 18 is an illustration of the positional relationship between a sound source and a microphone;

FIG. 19 is an illustration of the whole of the third embodiment of the present invention;

FIG. 20 is a block diagram of a time difference/self-estimation computing section; and FIG. 21 is a flow chart illustrating the operation of an example of a self-estimation/control logic section.

DESCRIPTION OF THE PREFERRED EMBODIMENTS

Figure 1A:
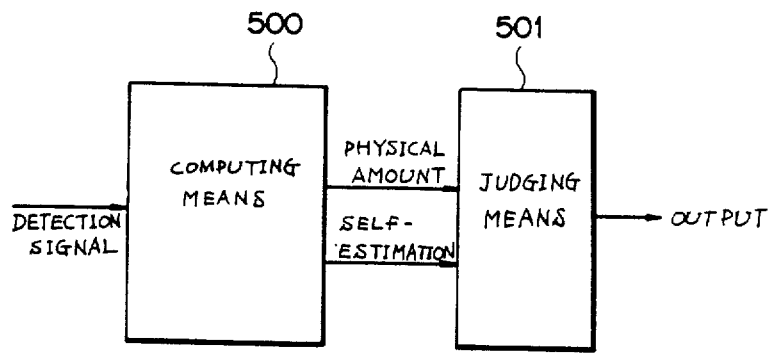
FIGS. 1A and 1B illustrate an apparatus of the present invention in its broadest concept.

A first aspect of the present invention is generally illustrated in FIG. 1A. Referring to FIG. 1A, signals representing data concerning an object to be measured are processed by computing means 500 by way of spatio-temporal derivative method so as to determine physical amounts of the object such as height data, velocity vector data, and so forth, and self-estimation values. Judging means 501, in turn, evaluates the validity or the degree of effectiveness of the physical amounts determined by the computing means based on the self-estimation values also determined by the computing means.

Figure 1B:
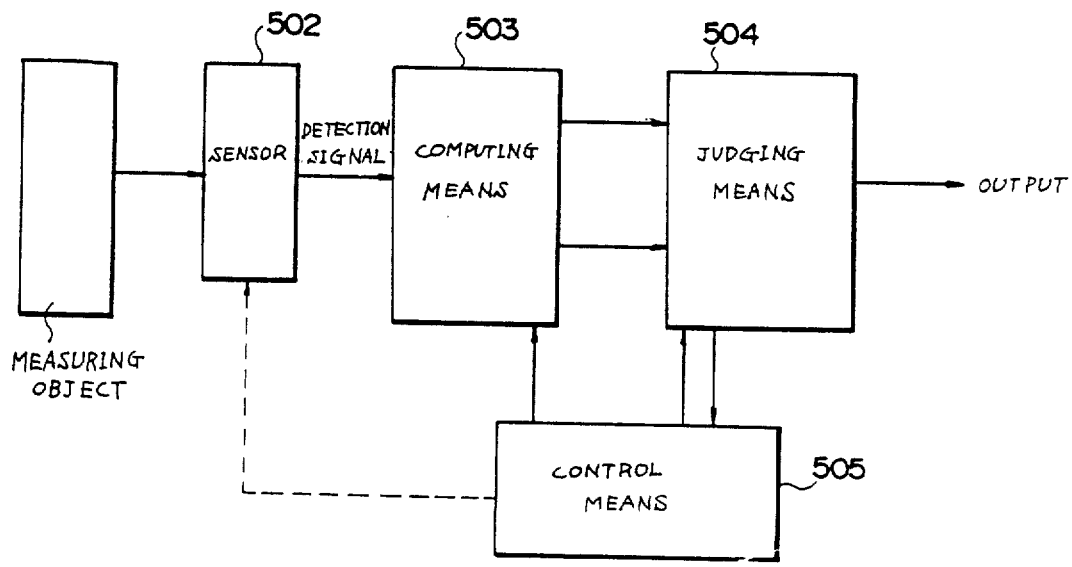

A second aspect of the present invention is generally illustrated in FIG. 1B. Referring to FIG. 1B, there is provided a measuring apparatus making use of spatio-temporal derivative method including sensors 502 for picking up signals representing data concerning an object to be measured; computing means 503 for processing the signals by spatio-temporal derivative method so as to determine physical amounts of the object and self-estimation values; judging means 504 for judging the validity of the physical amounts determined by the computing means on the basis of the self-estimation values; and control means 505 for varying, when there is any physical amount having low validity, measuring condition of the sensing means so as to enable the sensing means to obtain the signals again, while re-starting the computing means and the judging means.

Three embodiments of the present invention will be described hereinunder with reference to the accompanying drawings. A first embodiment is applied to a process for reproducing three-dimensional data through biopticular stereo vision. A second embodiment is applied to reproduction of a moving image. A third embodiment is applied to time difference detection for localizing a sound source.

First Embodiment

Figure 2A:
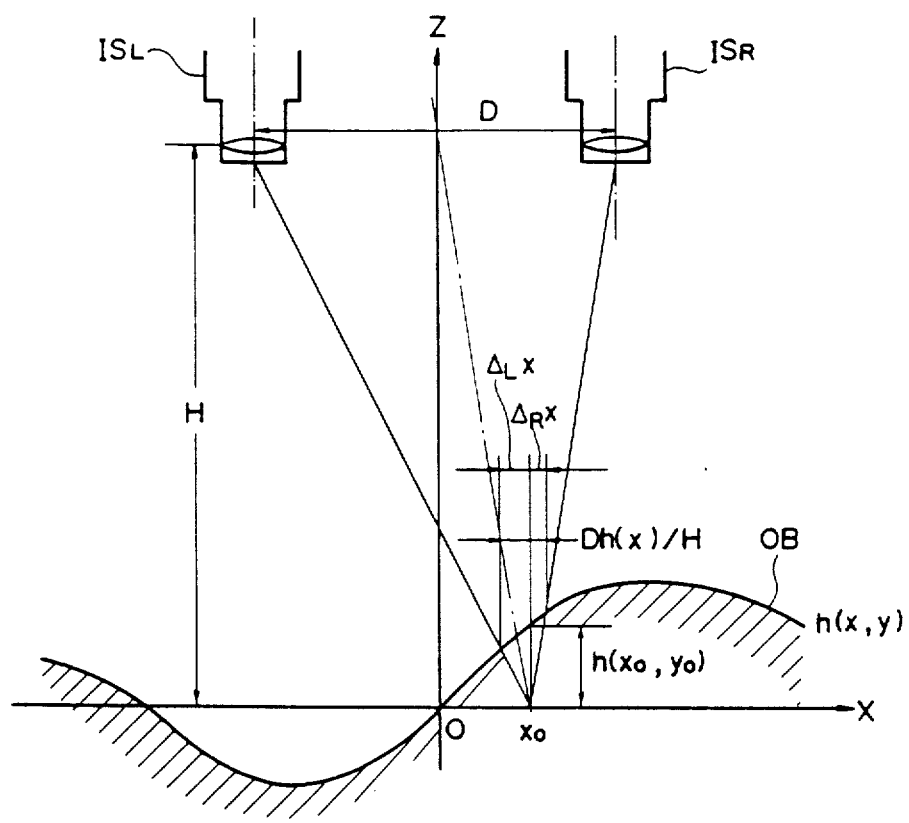
Figure 2B:
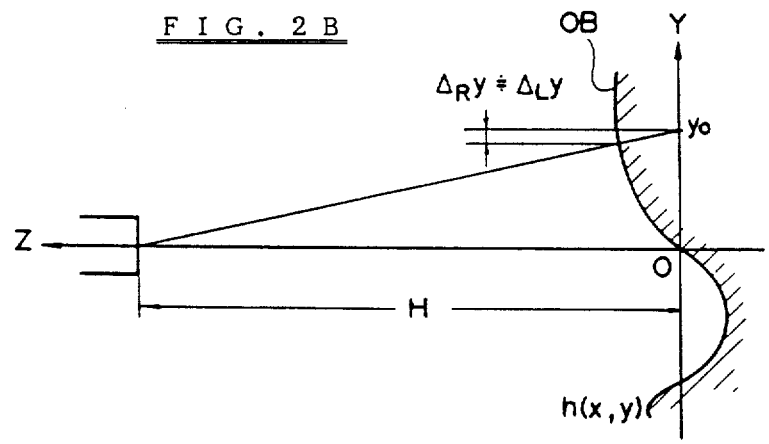
FIG. 2B is an illustration of the image pickup device and the object as viewed from the left side.

As shown in FIGS. 2A and 2B, a system is assumed here which has a pair of image pickup devices $IS_L$ and $IS_R$ which are spaced from each either by a distance D and are positioned at a vertical height H with respect to an object OB having convexed and concaved portions. The left and right image pickup devices $IS_L$ and $IS_R$ are so offset that the points of origin of their image planes aim at the origin of an xy plane. For the purpose of simplification of explanation, it is assumed here that both image pickup devices pickup correct images of the object at life size. Thus, the images picked up by the left and right image pickup devices can be expressed as functions of the coordinates (x,y) on the object, e.g., by $f_L(x,y)$ and $f_R(x,y)$. It is also assumed that the object OB has such a simple form that has a height z from the xy plane by the following formula:

$$z = h(x,y) \quad (1.1)$$

An additional assumption is made that the convexed and concaved surfaces of the object has specific distribution of density which also can be expressed by a function of the coordinates (x,y) as f(x,y).

The images picked up by the left and right image pickup devices $IS_L$ and $IS_R$ are those obtained by projecting the density distribution of the image surface onto the xy plane, so that these images involve offsets from the actual density distribution f(x,y) due to the influence of the convexity and concavity h(x,y). These offsets ($\Delta_{RX}$, $\Delta_{RY}$) and ($\Delta_{LX}$, $\Delta_{LY}$) are determined as follows, from opto-geometrical relationship shown in FIGS. 2A and 2B.

$$\Delta_{RX} \approx \frac{h(x,y)}{H} \left( \frac{D}{2} - x \right) \quad (1.2a)$$

$$\Delta_{LX} \approx -\frac{h(x,y)}{H} \left( \frac{D}{2} + x \right) \quad (1.2b)$$

$$\Delta_{RX} \approx \Delta_{LY} \approx -\frac{h(x,y)}{H} y \quad (1.2c)$$

Using these formulae expressing the offset amounts, the images $f_R(x,y)$ and $f_L(x,y)$ picked up by the right and left image pickup devices are expressed as follows:

$$f_R(x,y) = f(x + \Delta_{RX}, y + \Delta_{RY}) \quad (1.3a)$$
$$f_L(x,y) = f(x + \Delta_{LX}, y + \Delta_{LY}) \quad (1.3b)$$

Formulae (1.2a) to (1.2c) are transformed as follows:

$$x + \Delta_{RX} = \frac{H - h(x,y)}{H} x + \frac{D}{2H} h(x,y) \quad (1.4a)$$

$$x + \Delta_{LX} = \frac{H - h(x,y)}{H} y - \frac{D}{2H} h(x,y) \quad (1.4b)$$

$$y + \Delta_{RY} = y + \Delta_{LY} = \frac{H - h(x,y)}{H} y \quad (1.4c)$$

Thus, the offset affects also the scalars of the height h(x,y). As will be understood from the principle of the image pickup system, the image is magnified as the object approaches the lens. The scalars {H−h(x,y)}/H attached to x and y represent the magnification of the image. The density distribution on the convexed and concaved surfaces may be expressed in terms of a formula which take into account this scale magnification, rather than the function of the absolute coordinates (x,y). It is assumed that the density distribution f (x,y) taking into account the scale magnification is expressed as follows.

$$f(x,y) = f\left( \frac{H - h(x,y)}{H} x, \frac{H - h(x,y)}{H} y \right) \quad (1.5)$$

Then, the images are expressed as follows:

$$f_R(x,y) \approx f(x + \Delta_{RL}x, y) \quad (1.6a)$$
$$f_L(x,y) \approx f(x - \Delta_{RL}x, y) \quad (1.6b)$$

where, $\Delta_{RL}x$ is given as follows:

$$\Delta_{RL}x = \frac{Dh(x,y)}{2(H - h(x,y))} \quad (1.7)$$

Assuming here that the change in the height h(x,y) is so gentle that the height change is negligible in region of $\Delta_{RL}x$, i.e., that the following condition is met:

$$h_x(x,y) << 2H/D \quad (1.8)$$

The change of $\Delta_{RL}x$ is locally negligible. It is assumed also that the change in the density f(x,y) is smooth but much steeper than the height change h(x,y). The images are then approximated as follows through a Taylor development along the x-axis about the point (x,y).

$$f_R(x,y) = f(x + \Delta_{RL}x, y) = f(x,y) + \Delta_{RL}x f_x(x,y) \quad (1.9a)$$
$$f_L(x,y) = f(x - \Delta_{RL}x, y) = f(x,y) - \Delta_{RL}x f_x(x,y) \quad (1.9b)$$

The sum of and difference between these two formulae are obtained as follows:

$$f_R(x,y) + f_L(x,y) = 2f(x,y)$$
$$f_R(x,y) - f_L(x,y) = 2\Delta_{RL}x f_x(x,y)$$

The first formula is differentiated and the result is substituted for the second formula so as to eliminate the term of f(x,y), so that the following formula (1.10) is obtained.

$$\{\partial/\partial x(f_R(x,y) + f_L(x,y))\}\Delta_{RL}x \approx f_R(x,y) - f_L(x,y) \quad (1.10)$$

From the definition of "differentiation", it is obvious that the condition of the formula (1.10) exists when the value $\Delta_{RL}x$ infinitely approximates zero. It is understood that this condition can be applied to almost the whole area of the image.

The values $f_R(x,y)$ and $f_L(x,y)$ are the amounts which have been obtained by picking up the image of the three-dimensional object by means of the image pickup devices $IS_L$ and $IS_R$. Therefore, the formula (1.10) can be regarded as being a linear equation which employs $f_R(x,y)$ and $f_L(x,y)$ as the scalars and $\Delta_{RL}x$ as the unknown.

Concepts of sum image and difference image are respectively introduced as follows:

$$f_{R+L}(x,y) = f_R(x,y) + f_L(x,y) \quad (1.11a)$$
$$f_{R-L}(x,y) = f_R(x,y) - f_L(x,y) \quad (1.11a)$$

Using these concepts, the linear equation mentioned above is solved as follows:

$$\Delta_{RL}x = \frac{\Delta_{R-L}(x,y)}{\Delta_{R+L}x(x,y)} \quad (1.12)$$

The denominator $\Delta_{R+L}x(x,y)$ is the value obtained by differentiating the sum image in the direction of x-axis and, hence, can be expressed as follows.

$$f_{R+L}x(x,y) = \frac{f_{R+L}(x + \Delta_x, y) - f_{R+L}(x,y)}{\Delta_x} \quad (1.13)$$

Obviously, the sampling interval can be used as the value $\Delta x$.

The formula (1.12) includes terms corresponding to differentiation and difference of the images and, therefore, is seriously affected by noises. In addition, no measure is taken for coping with an undesirable case where the value $f_{R+L}x$ (x,y) happens to be zero.

Thus, the detection of three-dimensional image by spatio-temporal derivative method essentially requires that the number of computing operations be reduced to eliminate unfavorable effects of noises.

Figure 3:
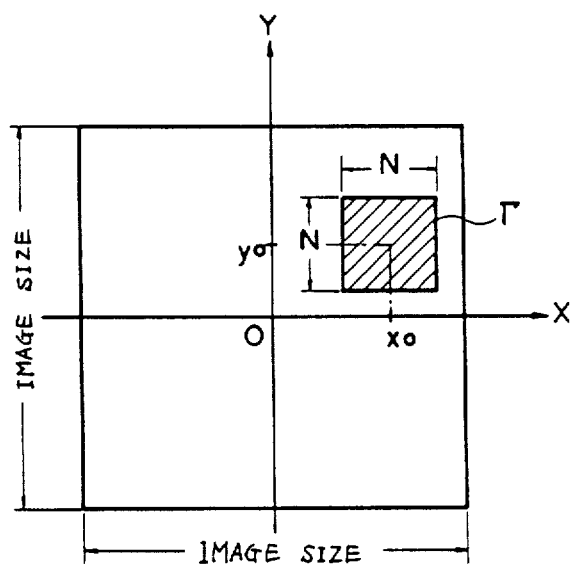

It is assumed here that the height of the object surface is substantially constant in a small environs or region around the picked up point. The size of this region will be referred to as "vicinity size", hereinunder. A height is then determined from a multiplicity of data acquired from the region corresponding to the environment size. The vicinity size is determined on the basis of both the spatial fineness of the density distribution f(x,y) and the resolution of measurement of convexity and concavity. Thus, the vicinity size is, for example $5 \times 5$ or $7 \times 7$. This region is represented by $\Gamma$ (See FIG. 3). Since assumption has been made that the value of $\Delta_{RL}x$ is constant within the rigion $\Gamma$, a condition of the following formula (1.14) is met at every points (x,y) within the region $\Gamma$.

$$f_{R+L}x(x,y)\Delta_{RL}x \approx f_{R-L}(x,y) \quad (1.14)$$

It is assumed here that the scalars $f_{R+L}x(x,y)$ and $f_{R-L}(x,y)$ vary within the region $\Gamma$. Thus, a plurality of equations corresponding in number to the number of pixels in the region $\Gamma$ are obtained. The value $\Delta_{RL}x$ is therefore determined by solving these simultaneous equations.

When the formula (1.14) is solved by the following least squares method, the sum of squares of (left side—right side) representing the adequateness of the formula (1.14) is minimized within the region $\Gamma$.

$$J = \iint_\Gamma \{f_{R+L}x(x,y)\Delta_{RL}x - f_{R-L}(x,y)\}^2 dxdy = \text{minimum} \quad (1.15)$$

The formula (1.15) is differentiated with $\Delta_{RL}x$ and set to be equal to zero, so that the following formula is obtained.

$$2S_{(R+Lx)(R+Lx)}\Delta_{RL}x - 2S_{(R+Lx)(R-L)} \quad (1.16)$$

The symbol S with suffixes represents the integration of the production of differentiations conducted in accordance with the following formula.

$$S_{ij}^d = \iint_\Gamma f_i f_j dxdy, \ i,j = R+Lx \text{ or } R-Lx \quad (1.17)$$

By substituting these values to the formula (1.16), $\Delta_{RL}x$ is obtained as follows.

$$\Delta_{RL}x = \frac{S_{(R+Lx)(R-Lx)}}{S_{(R+Lx)(R+Lx)}} \quad (1.18)$$

Therefore, the following relationship is derived from the formula (1.7) which represents the relationship between the amount of offset $\Delta_{RL}x$ and the height h(x,y).

$$h(x,y) = \frac{2H\Delta_{RL}x}{D + \Delta_{RL}x} = \frac{2H}{D}\Delta_{RL}x \quad (1.19)$$

It is thus possible to presume the height of the convexity or concavity.

In order that the condition of the formula (1.18) is stably obtained, it is necessary that the value of the denominator of this formula is sufficiently greater than zero. That is, the value determined by $J_{DET}{}^d = S_{(R+Lx)(R-Lx)}$, which determines the adequateness of the least squares method is sufficiently large. When the value $f_{R+L}x$ which represents the variation of the pattern in the direction of the x-axis is constantly zero within the region $\Gamma$, the value $S_{(R+Lx)(R-Lx)}$ also is zero. Thus, it is impossible to determine the amount of offset when there is no local pattern within the region $\Gamma$. From this point of view, it is essential that the size of the region $\Gamma$ is selected to maximize the change in the density within such a region.

Under the optimum condition, the criterion function J appearing in the formula (1.15) can be expressed as follows.

$$\begin{aligned} J_{RES} &= -\frac{\{\iint f_{R+L}x(x,y)f_{R-L}(x,y)dxdy\}^2}{\iint f_{R+L}x(x,y)^2 dxdy} + \\ &\quad \iint f_{R-L}x(x,y)^2 dxdy \\ &= -\frac{S_{(R+Lx)(R-Lx)}^2}{S_{(R+Lx)(R+Lx)}} + S_{(R-L)(R-L)} \end{aligned} \quad (1.20)$$

where, $S_{(R-L)(R-L)} = \iint_\Gamma f_{R-L}(x,y)^2 dxdy$

Since the value of this equation represents the residual error, it is possible to use this value as the criterion for the judgments concerning the adequateness of assumption of height within the vicinity region $\Gamma$, possibility of variation of pattern due to change in the viewing point (when there is a luster on the surface), and so on.

Since the process explained above is based upon the linear relationship (1.10) which exists when the offset amount is very small, this process cannot effect an adequate image processing when the offset amount is increased due to large convexity or concavity. The major portion of such error is attributable to the formulae (1.9a and 1.9b) which approximate the images with offset down to the first order of the Taylor development. In order to estimate the adequate region of this approximation, the formulae (1.9a) and (1.9b) are developed down to the second order as follows:

$$f(x \pm \Delta_{RL}x, y) = f(x,y) \pm \Delta_{RL}x f_x(x,y) + \frac{\Delta_{RL}x^2}{2} f_{xx}(x,y)$$

The condition for reducing the value of the term of the second order to a level much smaller than that of the first order is expressed as follows, making use of dispersions of these terms.

$$\Delta_{RL}x^2 << \frac{4E[fx(x,y)^2]}{E[fxx(x,y)^2]} \quad (1.21)$$

This relation suggests that the upper limit of the detectable offset is determined by the nature of the density of the object surface. That is, a greater measurable area is obtained as the mean energy of the first order differentiation becomes greater as compared with the mean energy of the second order differentiation. Thus, a density pattern having low spatial frequency components as the major components is preferably used.

It is possible to determine, from this formula, the conditions which are to be met by the image pickup system, for the object having a similar nature. By substituting the formula (1.19), the measurable area is estimated as follows.

$$|h(x,y)| << \frac{2H}{D}\left(\frac{4E[fx(x,y)^2]}{E[fxx(x,y)^2]}\right)^{\frac{1}{2}} \quad (1.22)$$

From this formula, it is understood that the distance D between the left and the right image pickup devices is preferably selected to be small as compared with the height or shooting distance H. This requirement is quite contrary to that demanded in trigonometrical survey. However, there is a practical limit in the reduction in the distance D because a too small distance D will increase the levels of noises.

An estimation will be made as to the amount of error which may be incurred due to involvement of noises in the values of pixels. The noises involved by pixels of the coordinates (x,y) of the left and right images are expressed by $n_L(x,y)$ and $n_R(x,y)$. Then, the sum image $f_{R+L}(x,y)$ and the difference image $f_{R-L}(x,y)$ are approximated by the following formulae (1.23a) and (1.23b), respectively.

$$f_{R+L}(x,y) \underset{d}{\simeq} 2f(x,y) + n_R(x,y) + n_L(x,y) \quad (1.23a)$$
$$= 2f(x,y) + n_{R+L}(x,y)$$

$$f_{R-L}(x,y) \underset{d}{\simeq} 2\Delta_{RL}x fx(x,y) + n_R(x,y) - n_L(x,y) \quad (1.23b)$$
$$= 2\Delta_{RL}x fx(x,y) + n_{R-L}(x,y)$$

Therefore, the differentiation $f_{R+L}(x,y)$ of the sum image obtained through computation can be expressed as follows by making use of the sampling interval $\Delta x$.

$$f_{R+L}(x,y) = 2fx(x,y) + \frac{n_{R+L}(x + \Delta x,y) - n_{R+L}(x,y)}{\Delta x}$$

It is to be noted that, when the noises applied to the pixels are statistically independent and uniform, there is no definite relation between $n_{R+L}(x,y)$ and $n_{R-L}(x,y)$ and these values are steady.

It is assumed here that the formula (1.12) is directly used in the computation of offset, while neglecting the presence of noises. In this case, the following condition is met.

$$\frac{f_{R-L}(x,y)}{f_{R+L}(x,y)} = \Delta_{RL}x + \frac{\Delta_{RL}x}{2fx(x,y)}\left(\frac{n_{R-L}(x,y)}{\Delta_{RL}x} - \frac{n_{R+L}(x+\Delta x,y) - n_{R+L}(x,y)}{\Delta x}\right)$$

Thus, the error is expressed by the second term of the right side of the formula, as follows.

$$\frac{\Delta_{RL}x}{2fx(x,y)}\left(\frac{n_{R-L}(x,y)}{\Delta_{RL}x} - \frac{n_{R+L}(x+\Delta x,y) - n_{R+L}(x,y)}{\Delta x}\right) \quad (1.24)$$

The following facts are derived from the formula (1.24): (1) that influence of noise becomes smaller as the density slope fx(x,y) becomes greater, (2) that the influence of the noise component common to the left and right images is increased in proportion to the offset, and (3) that the influence of the difference component is independent from the offset. It is also understood (4) that the error is increased as the sampling interval $\Delta x$ is decreased when the noises on pixels are independent, because the noise components common to both images are divided by the sampling interval.

On the other hand, in the least squares method, the error is determined as follows by a similar computation.

$$\frac{\Delta_{RL}x}{2\int\int fx(x,y)^2 dxdy} \cdot \int\int fx(x,y) \cdot \left(\frac{n_{R-L}(x,y)}{\Delta_{RL}x} - \frac{n_{R+L}(x+\Delta x,y) - n_{R+L}(x,y)}{\Delta x}\right) dxdy \quad (1.25)$$

The following facts are noted from the formula (1.25): (1) that influence of noise becomes smaller as the square sum of the density gradient fx(x,y) in the vicinity region $\Gamma$ becomes greater, (2) that the influence of the noise component common to the left and right images is increased in proportion to the offset, and (3) that the influence of the difference component is independent from the offset. These tendencies are basically the same as those in the formula (1.24). In this case, however, an averaging of the noise components is effected within the region $\Gamma$ when the correlation between noise components is rather small, so that the error can be reduced. It is also noted (4) that the error is increased as the sampling interval $\Delta x$ is decreased when the noises on pixels are independent, because the noise components common to both images are divided by the sampling interval. In this case, however, it is understood that (5), when the change in the density gradient fx(x,y) is comparatively small within the region $\Gamma$ (this is not equivalent to the image being flat), the integrated functions of the numerators are negated so that a remarkable reduction in the noise can be attained as compared with the case of the formula (1.24).

As will be understood from the foregoing description, the formulae (1.24) and (1.25) represent the error obtained when the amount of offset is measured regardless of the parameters D and H of location of the image pickup devices during the picking up of images. Therefore, the error involved in the measurement of the convexity and concavity is multiplied by 2H/D which is the scalar employed in the conversion of the offset into the height in accordance with the formula (1.19).

It is thus possible to determine the height h(x,y) for every points on the image by making use of local least squares method. It will be understood that this arithmetic operation is formulated in a very good order, from the view point of simultaneous processing over the entire area of the image. More specifically, the convexity and concavity h(x,y) can be determined simultaneously all over the area of the object by executing the following steps on the input image f, and then by multiplying by the scalar 2H/D of the formula (1.19).

(1) Computation of sum and difference, and spatial differentiation: $f_{R+L}x$, $f_{R-L}$ (2) Computation of auto/cross products $f^2_{R+L}x$, $f_{R+L}xf_{R-L}$ (3) Computation of moving average by $\Gamma$ $\Sigma f^2_{R+L}x$, $\Sigma f_{R+L}xF_{R-L}$ (4) Computation of ratio $\Sigma f_{R+L}xF_{R-L}/\Sigma f^2_{R+L}x = \Delta_{RL}x$ The computation in each step is rather simple, so that simultaneous processing for a multiple points can be conducted without difficulty from a theoretical point of view.

A practical form of the first embodiment described heretofore, applied to a detection of a three-dimensional image, will be explained hereinunder, with specific reference to FIGS. 4 to 10.

Figure 4:
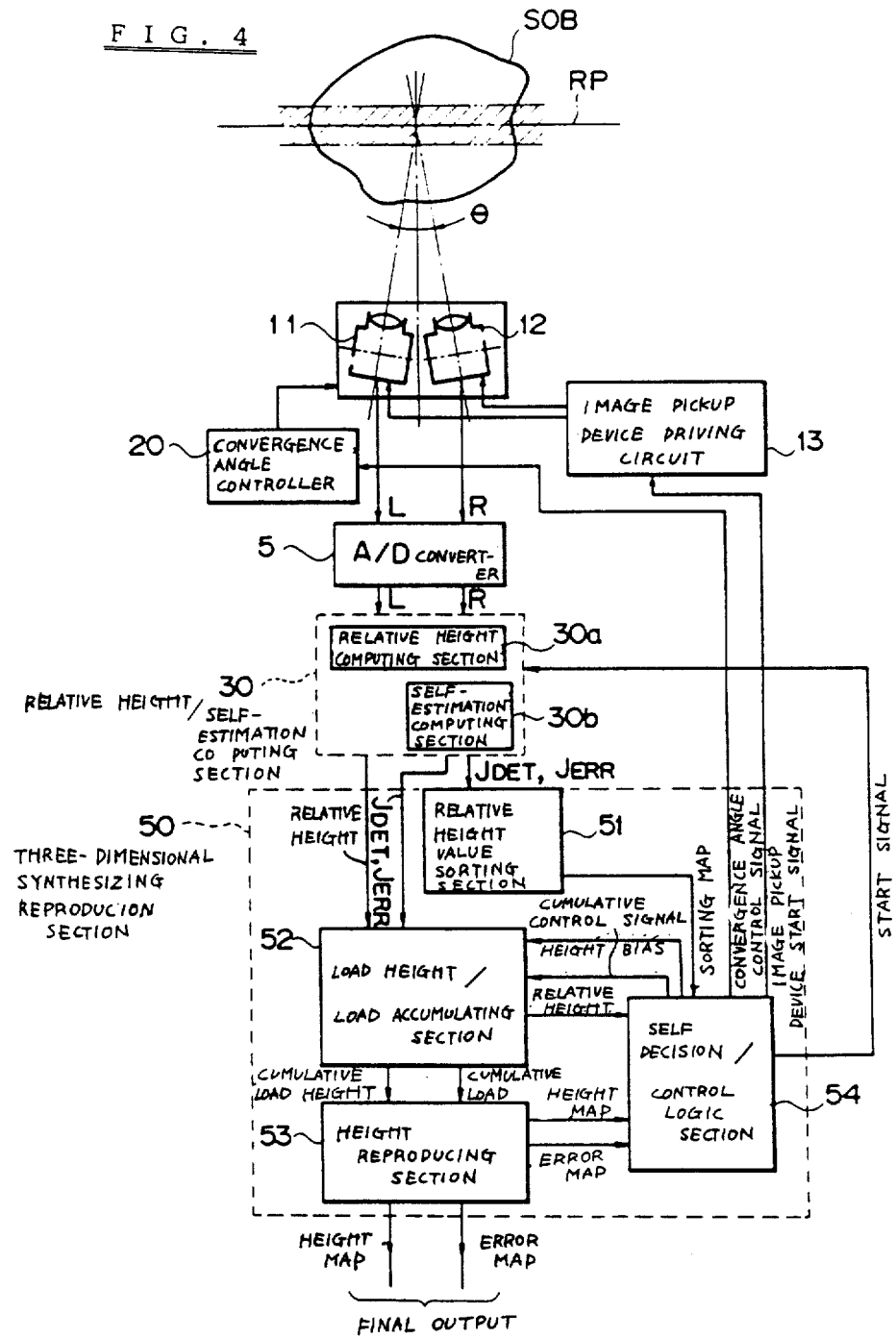
Figure 5:
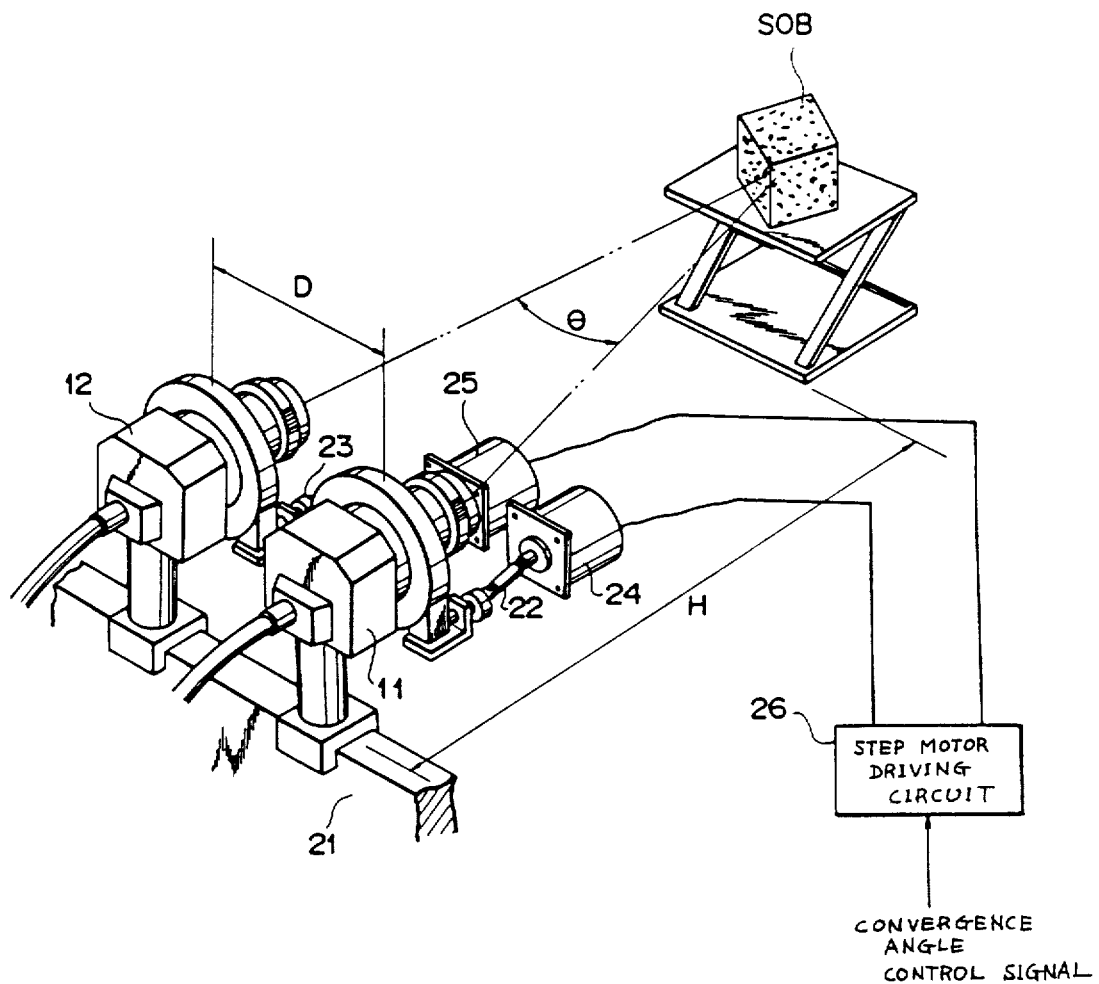

Referring to FIG. 4, a pair of cameras 11, 12 as solid-state image pickup devices are arranged such that their optical axes intersect each other at a convergence angle $\theta$ at a point on a reference plane RP on which a stationary three-dimensional object SOB is placed. Each camera incorporates an image sensor (MC-9000 produced by RETICON) having 128×128 pixels. These cameras are controlled in accordance with pixel clocks and synchronizing signals from an image pickup device driving circuit 13. The optical axes of the cameras 11 and 12 are adapted to be rotated by the operation of a convergence angle controller 20 and the reference plane RP can be moved towards and away from the cameras. i.e., up and down as viewed in FIG. 4. More specifically, as shown in FIG. 5, both cameras 11 and 12 are placed on a base 21 and these cameras are coupled to step motors 24 and 25 through couplers 22 and 23. These step motors 24 and 25 are adapted to operate in accordance with signals from the driving circuit 26. That is, a convergence angle conrol signal from a later-mentioned self-decision/control logic section is supplied to the driving circuit 26 so that the rotors of the step motors 24 and 25 rotate through predetermined numbers of steps so that the optical axes of the cameras 11 and 12 are rotated to vary the convergence angle $\theta$ whereby the point of intersection can be moved towards and away from the reference plane RP.

Analog image signals L and R from both cameras 11 and 12 are converted into digital signals L and R by means of an A/D converter 5 and the thus obtained digital signals are input to a relative-height/self-estimation computing section 30 in which relative height $J_{DET}$ and self-estimation $J_{ERR}$, both of which will be described later, are determined and delivered to a three-dimensional synthesizing reproduction section 50.

The three-dimensional synthesizing reproduction section 50 performs a computation which will be detailed later, so as to produce and output a height map and an error map. A three-dimensional data concerning the object SOB is detected from this height map.

A description will be made as to the relative-height/self-estimation computing section 30 and the three-dimensional synthesizing reproduction section 50.

(1) Relative-height/self-estimation computing section 30

Figure 6:
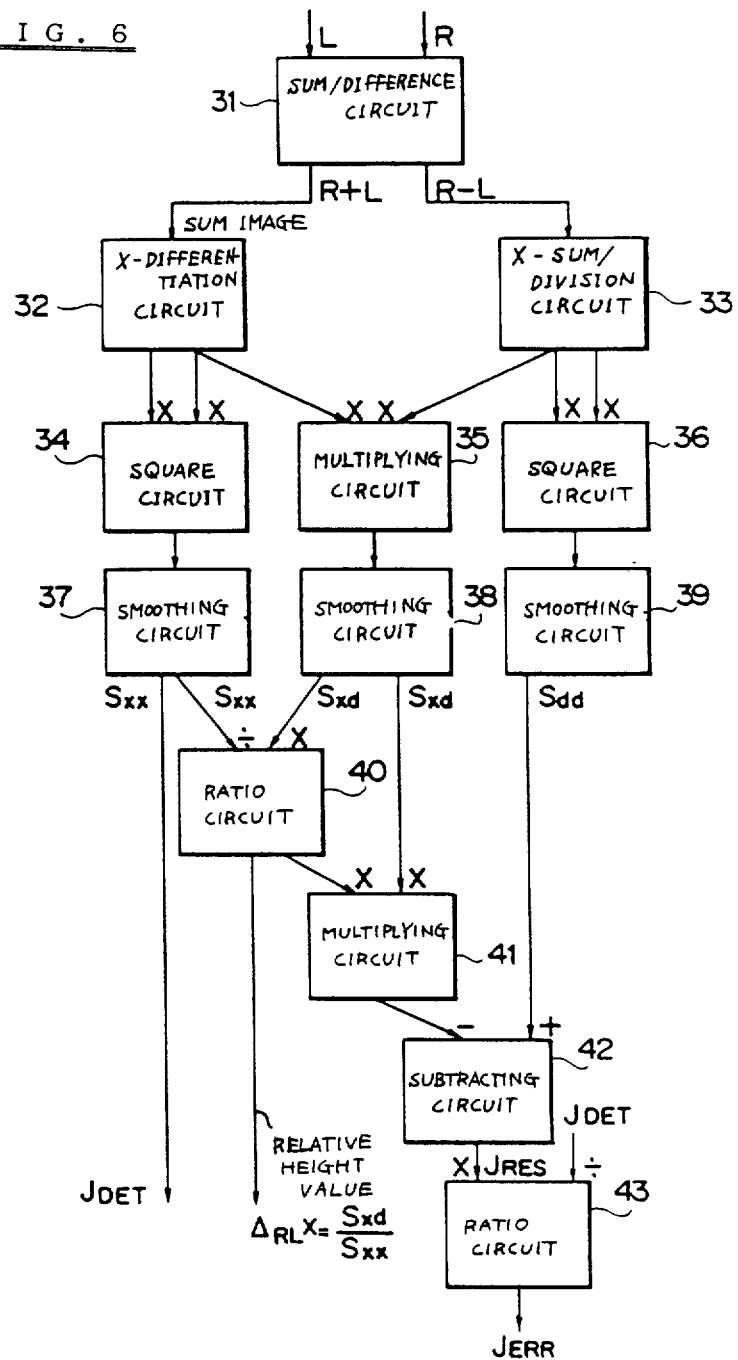

This section 30 is constituted by a relative-height computing section 30a and a self-estimation computing section 30b. An example of the computing section 30b is shown in FIG. 6.

The image signals L and R are delivered to a sum/difference circuit 31 which calculates a sum image signal R+L and a difference image signal R−L. The sum image signal R+L is delivered to an X-differentiation circuit 32 which is adapted to differentiate the sum image signal into a differentiated value $f_{R+L}x(x,y)$. The difference image signal R−L is delivered to an X-sum/division circuit 33 which is adapted to compute the mean value $f_{R-L}(x,y)$ between two adjacent points. This circuit 33, however, is not essential and may be dispensed with. The value obtained through the X-differentiation is supplied to a square circuit 34 and a multiplying circuit 35. On the other hand, the mean value is input to a square circuit 36 and the multiplying circuit 35.

The square circuit 34 is adapted to compute the square of the differentiated value $f_{R+L}x(x,y)$ of the sum image signal, and the result of this computation is supplied to a smoothing circuit 37. The smoothing circuit 37 is adapted to integrate the input signal over a predetermined vicinity size, e.g., 5×5 pixels so as to obtain an integrated value $S_{xx}$ and delivers the same as a self-estimation value $J_{DET}$ to a three-dimensional synthetic reproducing section 50 and also to ratio circuits 40 and 43.

The output $S_{xx}$ corresponds to $S_{(R+L}x)_{(R+L)}$ of the formula (1.18) mentioned before and, therefore, can be expressed as follows:

$$S_{xx} = \int\int \Gamma f_{R+L}x(x,y)^2 dxdy = J_{DET}$$

The multiplying circuit 35 multiplies the differentiated value $f_{R+L}x(x,y)$ with the sum/divided value $f_{R-L}(x,y)$ of the difference image signal. The result of this computation is delivered to a smoothing circuit 38 which integrates the input signal over the above-mentioned vicinity size and delivers the output $S_{xd}$ to the ratio circuit 40 and a multiplying circuit 41.

The output $S_{xd}$ corresponds to $S_{(R+L}x)(R-L)$ of the formula (1.18) mentioned before and, therefore, can be expressed as follows:

$$S_{xd} = \int\int \Gamma f_{R+L}x(x,y)f_{R-L}(x,y)dxdy$$

On the other hand, the square circuit 36 squares the sum/divided value $f_{R-L}(x,y)$ of the difference image signal. The result of this operation is input to a smoothing circuit 39. The smoothing circuit 39 integrates the input signal over the vicinity size and delivers the output $S_{dd}$ to a subtracting circuit 42.

The output $S_{dd}$ corresponds to $S_{(R-L)(R-L)}$ of the formula (1.20) mentioned before and, therefore, can be expressed as follows:

$$S_{dd} = \int\int \Gamma f_{R-L}(x,y)^2 dxdy$$

Upon receipt of the input signals $S_{xx}$ and $S_{xd}$, the ratio circuit 40 conducts an operation in accordance with the following formula:

$$(S_{xd}/S_{xx}) = \Delta RL^x$$

It is thus possible to compute the value of the relative height $\Delta_{RL}x$. The multiplying circuit 41 multiplies the output $\Delta_{RL}x$ with the output $S_{xd}$ of the smoothing circuit 38 so as to obtain a product $\Delta_{RL}x \times S_{xd}$, and delivers the product to the subtracting circuit 42. Upon receipt of the signals $\Delta_{RL}x \times S_{xd}$ and $S_{dd}$, the subtracting circuit 42 conducts the following computation:

$$S_{dd} - \Delta_{RL}x \times S_{xd} = J_{RES} \qquad (1.27)$$

This formula (1.27) corresponds to the formula (1.20). The ratio circuit 43 conducts an operation in accordance with the following formula (1.28), upon receipt of the output $J_{RES}$ of the substracting circuit 42 and the output $J_{DET}(S_{XX})$ of the smoothing circuit 37, so as to compute the amount $J_{ERR}$ of self-estimation.

$$\frac{J_{RES}}{J_{DET}} = J_{ERR} \qquad (1.28)$$

Thus, the relative-height/self-estimation computing section 30 delivers the amount $J_{DET}$, $J_{ERR}$ and the relative height $\Delta_{RL}x$ to the three-dimensional synthesizing reproducing section 50.

(2) Three-dimensional Synthesizing Reproduction Section 50

As will be seen from FIG. 4, the three-dimensional synthesizing reproduction section 50 is composed of the following elements:

① Relative-height value sorting section 51

Figure 7:
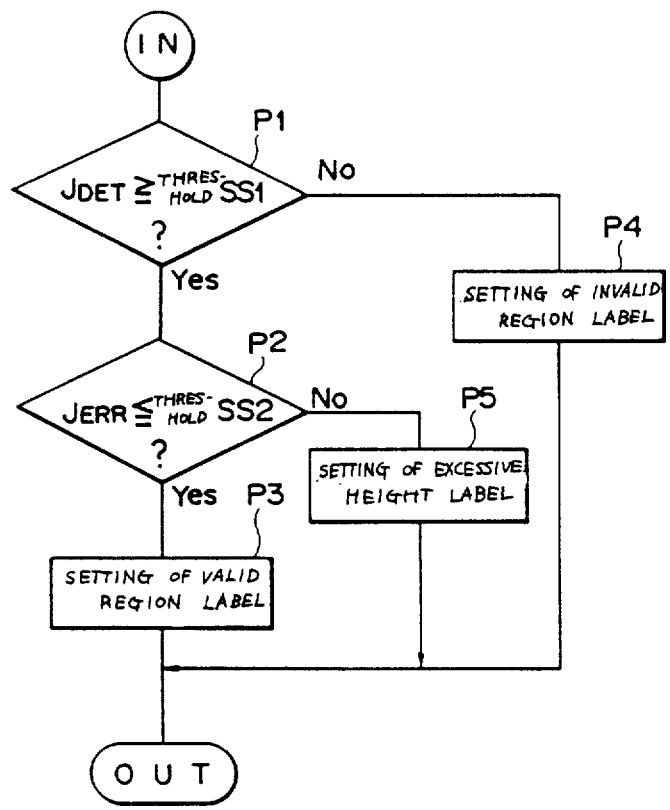

This section is realized in the form of a software which follows the process shown in FIG. 7, and is adapted for conducting sorting on the pixels of 128×128 for each vicinity size, in accordance with the self-estimation values $J_{DET}$ and $J_{ERR}$ input thereto.

Namely, in Step P 1, the self-estimation value $J_{DET}$ from the relative-height/self-estimation computing section 30 is compared with a predetermined threshold value SS1. If the condition of $J_{DET} \geq SS1$ (threshold value) is met, the process proceeds to Step P 2 in which the self-estimation value $J_{ERR}$ from the relative-height-/self-estimation computing section 30 is compared with another predetermined threshold SS2. If the condition of $J_{ERR} \leq SS2$ is met, the process proceeds to Step P 3 in which a label representing "valid area" is imparted to the central pixel of the vicinity size which is the object of the computaiton of the self-estimation value $J_{ERR}$.

Conversely, if the answer to the question posed in Step P 1 is "NO", a label indicative of "invalid area" is given to the central pixel of the vicinity size in Step P 4. If the answer to the question posed in Step P 2 is "NO", a label indicative of "excessive height area" is given in Step P 5.

Namely, the self-estimation value $J_{DET}$ is intended for determining the adequateness of the normal equation (1.16) for validating the least squares method and, therefore, has to be sufficiently large. On the other hand, assuming here that the errors are caused solely by the noises of pixels, the self-estimation value $J_{ERR}$ is proportional to the dispersion $\Delta^2$ of the noise. The self-estimation value $J_{ERR}$, therefore, can be used as a value which enables the error to be estimated beforehand. Thus, the smaller value $J_{ERR}$ provides the better effect.

② Load-height/Load-accumulating section 52

Figure 8:
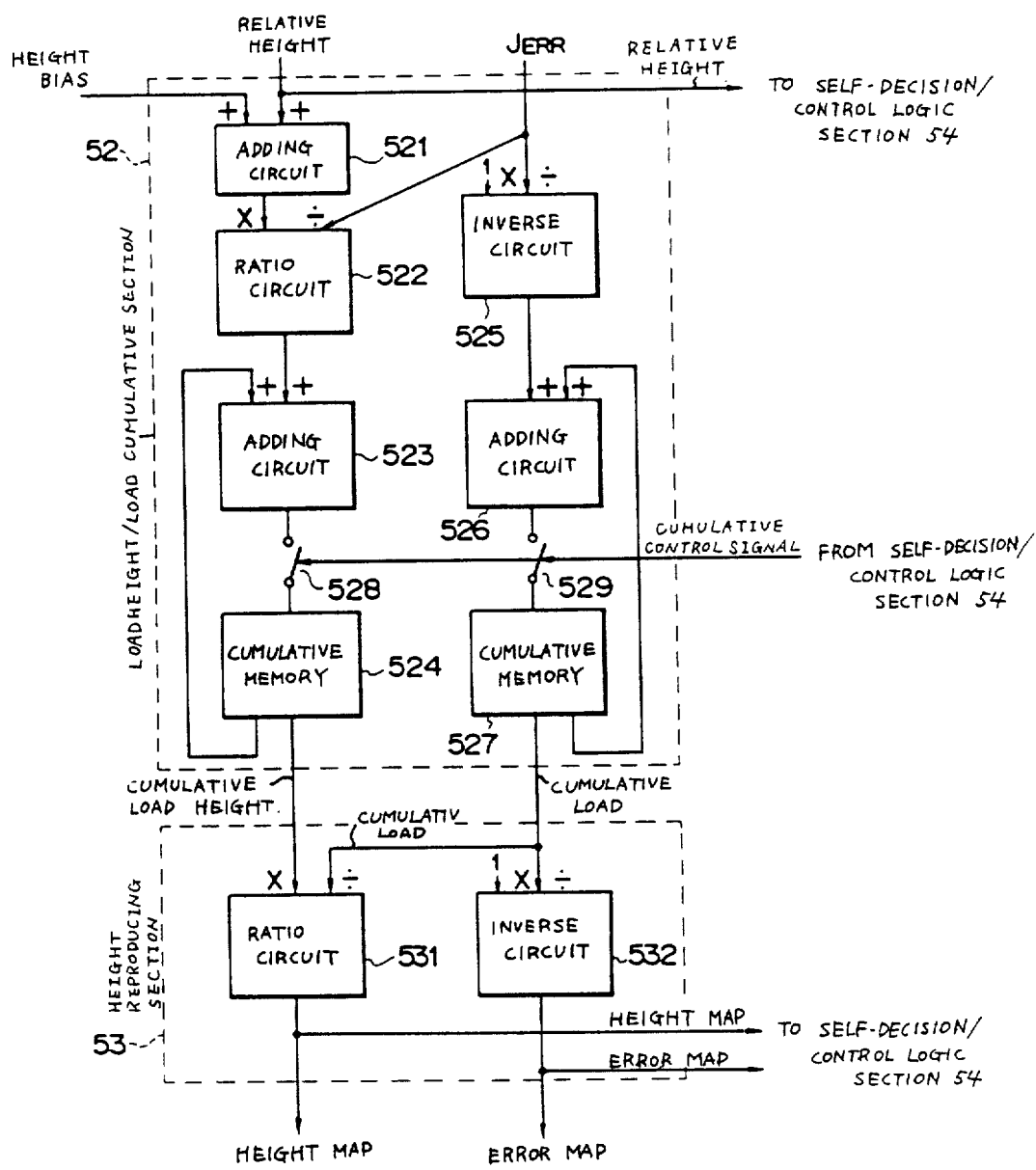

This section is realized in the form of a circuit shown in FIG. 8. This section is adapted for computing cumulative load height and cumulative load, upon receipt of the relative height $\Delta_{RL}x$, self-estimation value $J_{ERR}$ which is used as the load, and a height bias which will be explained later.

Thus, the relative height and the height bias are input to an adder circuit 521 for each of the vicinity regions which are sorted as being valid, and the sum of these two inputs is delivered to a ratio circuit 522.

The ratio circuit 522 receives also the self-estimation value $J_{ERR}$ and conducts the following computation.

relative height + height bias/$J_{ERR}$

The output is delivered to an adder circuit 523 to which is connected a cumulative memory 524 through a switch 528. The output from the cumulative memory 524 is input to the adder circuit 523. Therefore, the adder circuit 523 adds new data to the old cumulative data and outputs the result of this addition, as follows.

(relative height + height bias/$J_{ERR}$) + cumulative load height

With this arrangement, therefore, the cumulative memory 524 can output the cumulative load height for each pixel.

The self-estimation value $J_{ERR}$ is input to an inverse circuit 525 which delivers the inverse $1/J_{ERR}$ to the next stage constituted by an adder circuit 526. A cumulative memory 527, which is connected to the adder circuit 526 through a switch 529, is input to the adder circuit 526. Thus, the adder circuit 526 adds new data to old cumulative data such as $(1/J_{ERR})$ + cumulative load, and outputs the result of this addition. With this circuit arrangement, the cumulative memory 527 outputs cumulative load of each pixel.

The switches 528 and 529 mentioned above are adapted to be turned on and off in accordance with an accumulation control signal derived from a self-decision/control logic section 54 which will be mentioned later.

③ Height reproduction section 53

This section is realized in the form of a circuit shown in FIG. 8 and is adapted to output a height map and an error map in accordance with the cumulative load height and the cumulative load which are delivered by the load height/load accumulation section 52.

More specifically, the cumulative load height and the cumulative load are input to a ratio circuit 531 which is adapted to conduct a computation in accordance with the following formula:

cumulative load height/cumulative load = height map

The output is delivered to the later-mentioned self-decision/control logic section 54 and is also picked up as the final output data.

Meanwhile, the cumulative load is input to an inverse circuit 532 so that the inverse of the cumulative load is computed as follows:

(1/cumulative load) = error map

The error map also is delivered to the later-mentioned self-decision/control logic section 54 and is also picked up as the final output data.

④ Self-decision/Control Logic section 54

This section is realized in the form of a software which follows a process as shown in FIG. 9. This section computes and outputs various signals such as a height bias, a cumulative control signal, convergence angle control signal, image pickup camera start signal and a start signal for starting the relative height computing section, upon receipt of data such as the sorting map from the relative height value sorting section 51, relative height from the relative height computing section 30a and the height map and the error map from the relative height reproducing section 53.

Namely, referring to FIG. 9, cumulative region and the convergence angle are initialized in Step P 11 and, in Step P 12, valid region is extracted in accordance with the sorting map. In Step P 13, cumulative definite region is extracted in accordance with the error map. This operation is to extract a region which satisfy the condition of error map $\leq$ SS3, where SS3 represents a predetermined threshold.

Then, in Step P 14, an operation is conducted to extract the area where the regions extracted in Steps P 12 and P 13 overlap each other. Then, in Step P 15, the mean value of the relative height within the overlap area, i.e., the height bias (mean height difference) is extracted and the thus extracted height bias is input to an adder circuit 521 in FIG. 8.

The operation conducted in Steps P 12 through P 15 may be substituted by an operation which determines the height bias by computing the amount of displacement of the reference plane RP from the change in the convergence angle.

In Step P 16, a cumulative control signal is output so as to close the switches 528 and 529 shown in FIG. 8 and the relative heights of the pixels in the vicinity region are added to the height bias determined in Step P 15 mentioned above. Thereafter, the cumulative load height is stored in a cumulative memory 524 and the corresponding cumulative load is stored in a cumulative memory 527. The process then proceeds to Steps P 17 and P 18 in which height load region and height indefinite region are extracted, respectively. The term "height indefinite region" is used to mean the region out of the cumulative definite region extracted in Step P 13 mentioned before. Then, in Step P 19, the area where both regions overlap each other, i.e., a measurable region in which the measurement has not been finished yet, is detected as the remaining region. The process then proceeds to Step P 20 in which a judgment is conducted as to whether any remaining region exists. If there is any remaining region, the process proceeds to Step P 21 in which a convergence angle control signal is delivered to the step motor driving circuit 26 so as to control both cameras 11 and 12 by predetermined amounts. For instance, the convergence angle is so adjusted that the reference plane RP is offset forward by 2 cm. After the control of the convergence angle of the cameras 11 and 12, the process proceeds to Step P 22 in which an image pickup device start signal is delivered to the image pickup device driving circuit 13 thereby instructing the cameras 11 and 12 to pickup the images of the object SOB. A starting signal also is delivered to the relative height computing section 30a so as to start the latter. The process is then finished if no remaining region has been detected in Step P 20 mentioned before. Although not shown, the process is finished also when the convergence angle of the cameras 11 and 12 has exceeded a predetermined limit value.

Figure 11A:
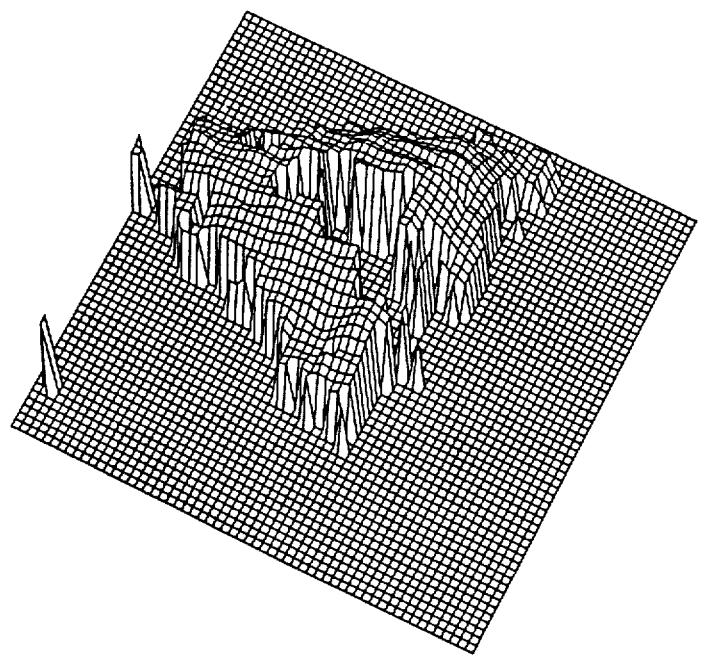

FIGS. 11A to 11C show an example of the result of experiment conducted by using, as the measuring object, a cubic member shown in FIG. 5 having random dots on the surface thereof. More specifically, FIGS. 11A and 11B are height maps obtained with different values of the convergence angle $\theta$, while FIG. 11C shows the final result as obtained by composing a plurality of such height maps.

Figure 11D:
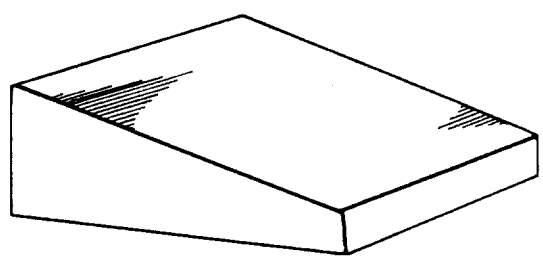
Figure 11E:
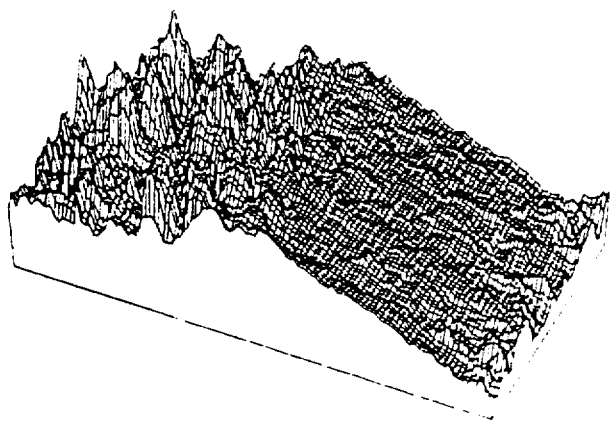
Figure 11F:
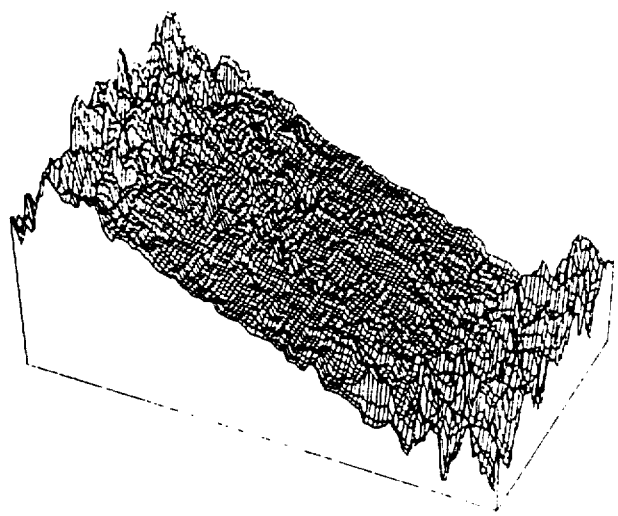
Figure 11G:
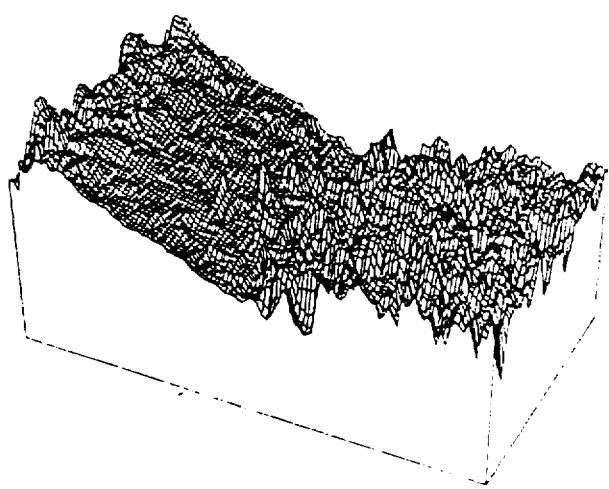

FIGS. 11E to 11G show the results of measurement conducted on a wedge as shown in FIG. 11D, more particularly, height maps as obtained from valid data attained with different values of the convergence angle $\theta$. The wedge is beforehand provided with random dot pattern.

As will be understood from the foregoing description, the detection of three-dimensional object in accordance with the first embodiment of the present invention is conducted in accordance with the following process:

(1) Two types of images (differentiated image and difference image), which employ as the pixel values the spatially differentiated value and the difference between left and right images, are formed from series of images obtained with respect to a predetermined reference plane $RP_0$.

(2) Two types of image (product image) constituted by pixels of values which are the products of the two types of image formed in Step (1) above are formed.

(3) These two types of image are smoothed by the dot diffusion function in the vicinity region $\Gamma$ of a predetermined vicinity size, thus determining a smoothed product image.

(4) The ratios between the products and the sums are computed over the entire portion of the image.

This series of operation can be conducted without difficulty by multi-stage parallel computing circuits as shown in FIGS. 6 and 9, so that the three-dimensional data can be detected in real time. The Step (4) mentioned above may be further divided into a plurality of sub steps.

The three-dimensional data detected on the basis of the self-estimation values $J_{DET}$ and $J_{ERR}$ computed in the course of the operation for detecting the three-dimensional data is evaluated to conduct decision which includes decision as to whether the thus detected three-dimensional data is valid or not. Then, weight is given in accordance with the load $J_{ERR}$ to the three-dimensional data derived from the region which has been judged as being valid, thus effecting weighting in accordance with the degree of validity, thereby reproducing the image of the objective three-dimensional body. In regard to the region which has been judged as being invalid, the above-mentioned operation is repeatedly conducted while moving the reference plane RP back and forth, i.e., while varying the distance H. It is, therefore, possible to reproduce, with a high degree of precision, a three-dimensional image by means of spatio-temporal derivative method which heretofore has been considered impractical due to difficulty in eliminating unfavorable effects produced by environmental conditions such as noises. The self-estimation value $J_{DET}$ is a factor which represents the possibility of detection or measurement. Thus, the greater value of $J_{DET}$ suggests a greater degree of validity. The self-estimation value $J_{ERR}$ is a factor which estimates the value of measure in the measurement. The value $J_{RES}$ represents the adequateness of the measuring conditions.

Although in the described embodiment the object is provided with a random dot pattern, this is not exclusive and the random dot pattern may be projected onto the object. In the case where the object has no pattern on its surface, it is necessary to project a random dot pattern on the object surface thus imparting a density pattern on the object surface. A higher detection accuracy will be obtained by altering the convergence at each measurement and also projecting a random pattern on the object each time the measurement is conducted.

Further, while, in the described embodiment, digital image signals from A/D converter 5 are directly input to the relative height/self-estimation computing section 30, the digital image signals may alternatively be first stored in a frame memory and subsequent computation process may be conducted one after another in accordance with output signals provided from the frame memory. For example, in case where the convergence angle should be changed many times such as thirty to forty times, it will be time consuming to change the convergence angle after completing the computation process of image signals obtained by the same convergence angle, and therefore, the precision of measurement would be deteriorated especially where the measuring object is a face of a human being which tends to move frequently. Accordingly, it is more preferable to store image signals obtained by all of the convergence angles into the frame memory in accordance with the above-mentioned alternative.

Furthermore, while the reference plane RP is shifted by controlling the convergence angle of the cameras 11 and 12 in the described embodiment, the reference plane RP, as an alternative, may be shifted by electrically controlling the image signals from the cameras. In order to achieve such an alternative, a primary point of a screen of either one of the cameras should be merely shifted by an extent of a predetermined pixel range, and it should be sufficient to provide a delay circuit at a subsequent stage of the A/D converter 5.

Second Embodiment

As explained in connection with the prior art, the detection of a moving image by spatio-temporal derivative method essentially requires the amount of computation to be minimized so as to keep the detection from the unfavorable effect of noises. The elimination of unfavorable effect of noises will require a reduction in the degree of freedom of solution and to increase the amount of data which materially contributes to the solution.

In this embodiment, however, it is simply assumed that the velocity field in the vicinity of a preselected point is approximated as being constant. On this assumption, the data obtained in the vicinity region are simultaneously processed so that a velocity is determined. The size of the vicinity region is determined in consideration of both the fineness of density of the object and the spatial resolution of the velocity measurement. Representing this region by $\Gamma$, it is necessary that the following condition is met everywhere in the region $\Gamma$.

$$ufx(x,y) + vfy(x,y) + ft(x,y) = 0 \qquad (2.1)$$

The adequateness or inadequateness of existence of this condition in the region $\Gamma$ is evaluated by square integration of the left side of this formula and minimizing the result for each of the vicinity regions as follows:

$$J^d = \int\int \Gamma\{ufx + vfy + ft\}^2 dxdy = \text{minimum} \qquad (2.2)$$

In this formula, however, the variable (x,y) is omitted. By differentiating this equation by u and v, respectively, and equalizing the same to zero, the following normal equations are obtained.

$$\begin{cases} uS_{xx} + vS_{xy} + S_{xt} = 0 \\ uS_{xy} + vS_{yy} + S_{yt} = 0 \end{cases} \qquad (2.3)$$

The symbol S with suffixes represent the integrated value of products of differentiated values represented by the following formula (2.4).

$$S_{ij} = \int\int \Gamma fi(x,y)fj(x,y)dxdy \qquad (2.4)$$

$i,j = x, y,$ or $t$ derivative

By solving the formula (2.3) using the values given by the formula (2.4), the velocity vector (u, v) is determined as follows:

$$u = \frac{S_{yt}S_{xy} - S_{xt}S_{yy}}{S_{xx}S_{yy} - S_{xy}^2} \qquad (2.5a)$$

$$v = \frac{S_{xt}S_{xy} - S_{yt}S_{xx}}{S_{xx}S_{yy} - S_{xy}^2} \qquad (2.5b)$$

This arithmetic operation has a construction suitable for simultaneous processing of data over the entire part of the image. Namely, the computation of $S_{xx}$, $S_{xy}$, $S_{yy}$, $S_{xt}$, $S_{yt}$, and $S_{tt}$, which employs a multiplicity of sum-of-squares operations can be substituted by a parallel computation which forms the following images sequentially with respect to the whole input image f.

(1) Spatio-temporal derivative images
fx, fy, ft
(2) Auto/cross product image
fx$^2$, fxfy, fy$^2$, fxft, fyft, ft$^2$
(3) Moving averaged image
$S_{xx}$, $S_{xy}$, $S_{yy}$, $S_{xt}$, $S_{yt}$, $S_{tt}$ The moving average corresponds to integration over the vicinity region $\Gamma$. No special computation is involved in these steps, so that these steps can be processed by a general image-processing hardware.

In the processing of moving image by spatio-temporal derivative method, the necessity for limiting the adaptation when the offset is small has greater importance than the sensitivity to noises. The solutions (2.5a) and (2.5b) are totally meaningless unless the approximation shown by the formula (2) explained in connection with the prior art is valid. Whether this approximation is valid or not cannot always be judged from the solutions. It is therefore necessary to grasp the range of velocity which would provide a practically satisfactory measuring accuracy and to judge whether the velocity of object falls within such a range of velocity.

Requirements inherent in this image processing method are that the vicinity size is suitably selected so as to avoid unnecessary reduction in the resolution and to increase the uniformity of velocity in the vicinity region. A description will therefore be made hereinunder as to the estimation value and criterion concerning these points.

(a) Estimation of possibility of detection

In order that the equation (2.3) is stably solved, it is necessary that the matrix of the scalar has a sufficiently large value. This matrix will be represented by $J_{DET}^2$, hereinunder. Thus, the following condition is met:

$$J_{DET}^2 \stackrel{d}{=} S_{xy}S_{yy} - S_{xy}^2 \qquad (2.6)$$
$$= \iint \Gamma fx^2 dxdy \iint \Gamma fy^2 dxdy - \{\iint \Gamma fxfy dxdy\}^2$$

From the condition of Schwartz inequality, the matrix $J_{DET}^2$ becomes zero only when the following condition is met everywhere in the vicinity region $\Gamma$.

$$fx(x,y) = Cfy(x,y) \qquad (C: \text{any constant})$$

This condition represents that the density is uniform along a straight line which is given by $x+y/c=$ constant. That is, the stable solution of the formula requires that the density varies with degrees of freedom in two directions within the vicinity region $\Gamma$. This requirement constitutes an index for the selection of the vicinity size $\Gamma$ and whether the vicinity region $\Gamma$ satisfy this requirement can be evaluated by making use of the matrix $J_{DET}^2$. Thus, the matrix $J_{DET}$ can be regarded as expressing the possibility of detection at the preselected point.

(b) Criterion for adequateness of assumption

The residual error $J_{RES}$ under the optimum condition is computed by substituting the formula (2.3) to the criterion function J as follows:

$$J_{RES} = \frac{2S_{xx}S_{yt}S_{xy} - S_{xx}^2 S_{yy} - S_{yt}^2 S_{xx}}{S_{xx}S_{YY} - S_{XY}^2} + S_{tt} \qquad (2.7a)$$

$$= uS_{xt} + vS_{yt} + S_{tt} \qquad (2.7b)$$

where, u and v represent the maximum conditions.

In general, this formula can be used as an index of inclusion of factors other than the factors derived from the model and, therefore, can be regarded as being basic data for judgment of various conditions such as the inadequateness of assumption concerning minute deviation, presence of pixel noises and fluctuation of velocity in the vicinity region $\Gamma$.

(c) Criterion for dispersion of measurement error

As will be understood from the definition given by the formula (2.2), the residual error $J_{RES}$ roughly represents the surface integration of the dispersion of errors, provided that the error is included only in the time differentiation fx. In fact, the primary approximation error of the Taylor development, which becomes dominant as the deviation of the image grows large, can be regarded as being equivalent to the error added to ft. In order to examine the propagation of this error to the solution, the error is expressed in terms of a white noise $\epsilon(x,y)$ which satisfies the following formula (2.8).

$$E[\Box(x_1,y_1),\epsilon(x_2,y_2)] = \Gamma^{-1}J_{RES}\delta(x_1-x_2,y_1-y_2) \qquad (2.8)$$

where, $\Gamma$ represents an area of the vicinity region $\Gamma$.

In this case, the dispersion of the errors $\xi^d = du - \bar{u}$, $\eta^d = v - \bar{v}$, ($\bar{u}$ and $\bar{v}$ are solutions obtained under the condition of $\epsilon(x,y)=0$) is determined by the following formula (2.9).

$$E[\xi^2 + \eta^2] = \frac{(S_{xx} + S_{yy})J_{RES}}{(S_{xx}S_{yy} - S_{xy}^2)\Gamma} \stackrel{d}{=} J_{ERR} \qquad (2.9)$$

The value $J_{ERR}$ suggests the inadequateness of the assumption and fluctuation in the solution which is expected from the density in the region around the preselected point. Thus, the value $J_{ERR}$ can be used roughly as an index of self-estimation of the measuring error.

In order that a measurement has a definite significance, it is necessary that the value $J_{DET}$ is greater than the value which is inevitably caused due to the pixel noises. It is assumed here that the vicinity region $\Gamma$ has a sufficiently ample size and that the autocorrelation function of the pixel noises is represented by $\Psi(x,y)$.

Then, the following equations are derived from the differentiation theorem of correlation function.

$$\iint \Gamma fx^2 dxdy \approx -\Gamma\Psi_{xx}(0,0) \qquad (2.10a)$$

$$\iint \Gamma fy^2 dxdy \approx -\Gamma\Psi_{yy}(0,0) \qquad (2.10b)$$

$$\iint \Gamma fy^2 dxdy \approx -\Gamma\Psi_{xy}(0,0) \qquad (2.10c)$$

It is thus possible to conduct a rough estimation. Namely, $J_{DET}$ can take a value near the value given by the following formula (2.11), by the contribution of the noises solely. It is assumed here that the pixel noises are independent and the pitch of the pixels is regulated at "1". It is also assumed that the noise is white and dispersion is $\sigma^2$ within the Nyquist band of sampling at interval "1". In such a case, the autocorrelation function is given by the following formula (2.12).

$$S_{xx}S_{yy} - S_{xy}^2 \approx \Gamma^2\{\Psi_{xx}(0,0)\Psi_{yy}(0,0) - \Psi_{xy}(0,0)\} \qquad (2.11)$$

$$\Psi(x,y) \approx \frac{\delta^2 \sin nx \sin ny}{n^2 xy} \qquad (2.12)$$

By substituting this function, the formula (2.11) can be calculated as $(\pi\sigma)^4/4$.

In consequence, the condition detection $J_{DET}$ is obtained as follows.

$$J_{DET} \geq \frac{\Gamma n^2 \delta^2}{2} \qquad (2.13)$$

The right side of this formula can be computed approximately as being about 62, assuming here that the dispersion $\sigma^2$ is 0.5 quantitizing unit$^2$ and that the vicinity size $\Gamma$ IS 5×5 PIXELS.

Since the value $J_{ERR}$ is an estimation of dispersion of the detection error, it is considered that this value directly represents the amount of the error in the measuring point where the condition of the formula (2.13) is met. Therefore, in this embodiment, the minimum allowable absolute accuracy $A_{ABS}$ and relative accuracy $A_{REL}$ are beforehand given and measuring points which do not meet the following condition are excluded from the final result.

$$J_{ERR} \leq A_{ABS}^2 \text{ or } J_{ERR} \leq A_{REL}^2 (u^2+v^2) \qquad (2.14)$$

In this embodiment, it is possible to sort the velocity field of the object into three regions through combining the estimation values $J_{DET}$ and $J_{RES}$ by making use of the formulae (2.13) and (2.14): namely, (1) a region in which the measuring condition is adequate so that a reliable velocity is obtained, (2) a region in which the measurement is considered as being possible because of the presence of pattern but the measurement could not be conducted with credibility due to excessive velocity and (3) a region in which the measurement is impossible because there is no pattern on the object. Any failure in the measurement due to lack of uniformity of velocity in the vicinity region can be sorted into the second region (2) mentioned above. The result of this sorting is not only output together with the final result but also is used in the setting of the measuring condition. Namely, when the region (1) is ample enough to provide a sufficient margin of the value of $J_{DET}$, the size of the vicinity region is reduced to attain higher degrees of uniformity of the resolution and velocity. When the region of the excessive velocity (2) is large, the frame interval is reduced to suppress deviation of images. When the region (3) is too wide, a suitable measure is taken such as an increase in the size of the vicinity region.

A description will be made hereinunder as to a practical example of the detection of a moving image in accordance with the second embodiment explained above, with specific reference to FIGS. 12 to 17F.

Figure 12:
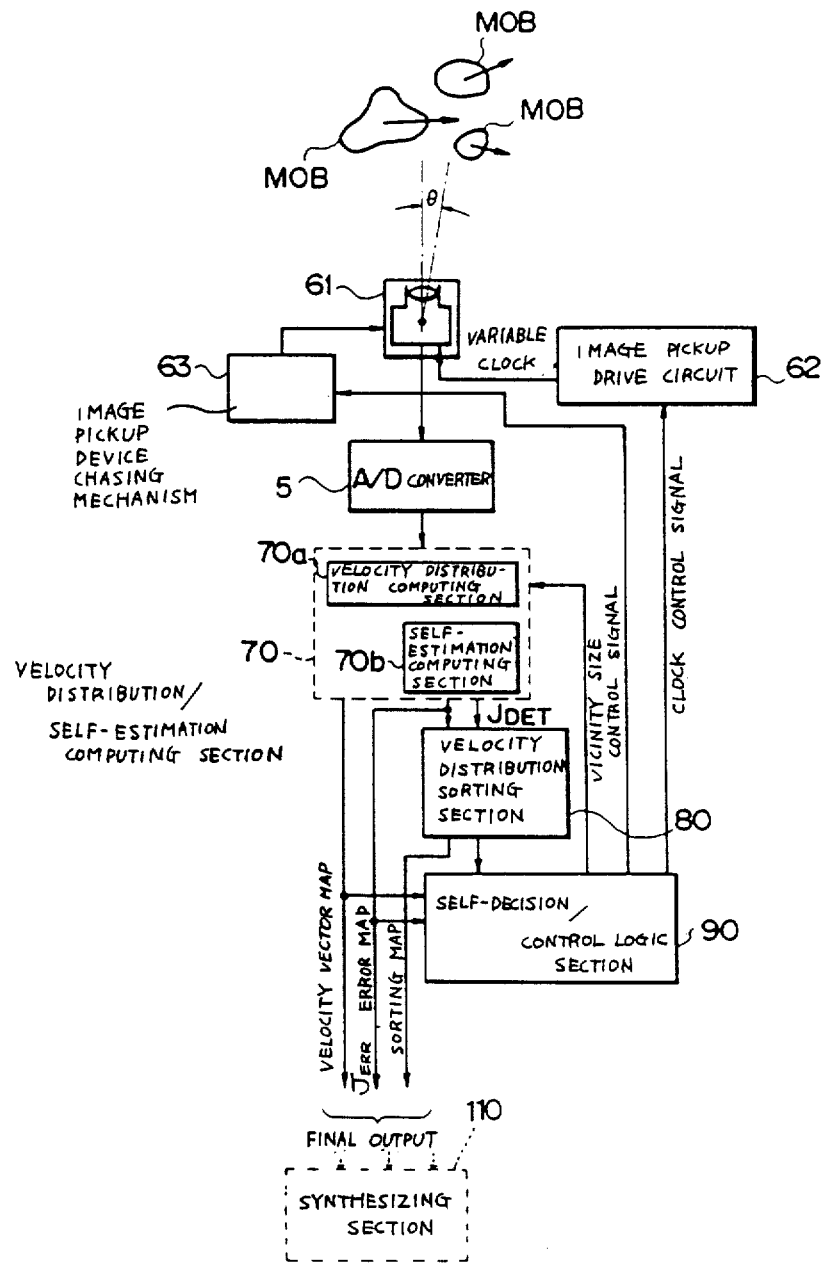

Referring to FIG. 12, a reference numeral 61 designates an image pickup camera which is adapted for picking up the image of a moving object MOB at a predetermined frame interval. The camera 61 is composed of an image sensor (MC-9128 produced by RETICON) having 128×128 pixels. The camera 61 can vary the shooting speed or rate within a range between 10 and 500 frames per second in accordance with the pixel clocks from the image pickup device driving circuit 62. The control of the pixel clock is conducted in accordance with a clock control signal which is derived from self-decision/control logic section 90 which will be detailed later.

It is possible to enlarge the detectable area by arranging such that the camera 61 follows up the movement of the moving object MOB at an angle $\theta$ by the operation of a chasing mechanism 63 when the translational component of the measuring object is not zero.

Analog image signals from two adjacent frames of an image pickup camera 61 are converted into digital image signals and delivered to a velocity-distribution/self-estimation computing section 70 which produces, as final outputs, a velocity vector map and an error map (self-estimation value) $J_{ERR}$ both of which will be mentioned later. At the same time, this computing section delivers self estimation values $J_{DET}$ and $J_{ERR}$ to a later-mentioned velocity-distribution sorting section 80. The velocity-distribution sorting section 80 is adapted for conducting sorting operation for each of vicinity size on each of the 128×128 pixels, and sets a label expressing a valid region, excessive-velocity region or an invalid region on the central pixel of each vicinity region.

The data of the pixel with the label set thereon, together with the velocity vector map and self-estimation value $J_{ERR}$ from the velocity-distribution/self-estimation computing section 70, is delivered to a self-decision/control logic section 90 which is adapted to control, as will be explained later, expansion and contraction of the vicinity size, as well as increase and decrease of the pixel clock frequency.

Each of these constituents will be described hereinunder.

(1) Velocity-distribution/self-estimation computing section 70

Figure 13A:
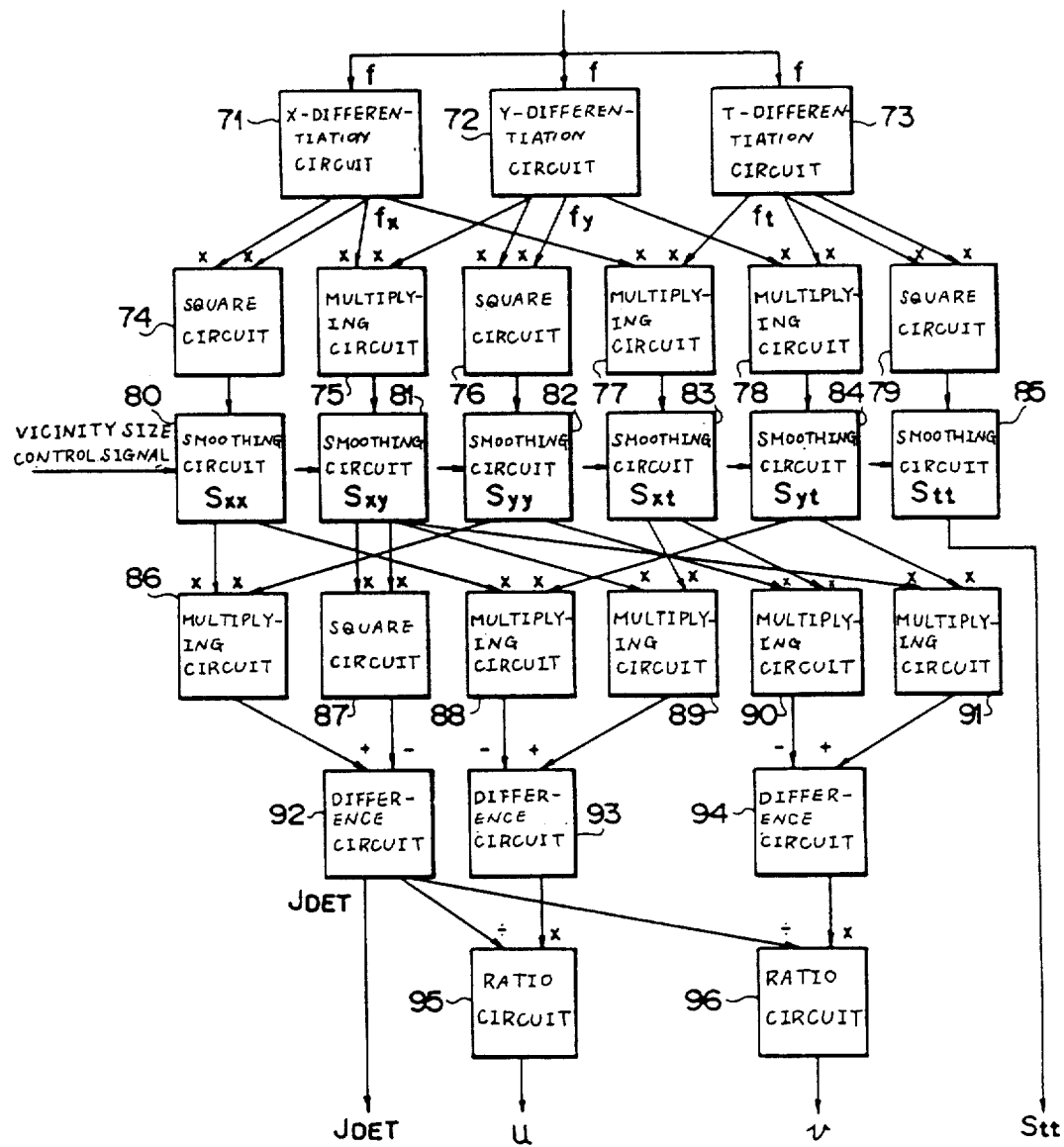
FIG. 13A is a block diagram showing an example of the velocity distribution computing section.
Figure 13B:
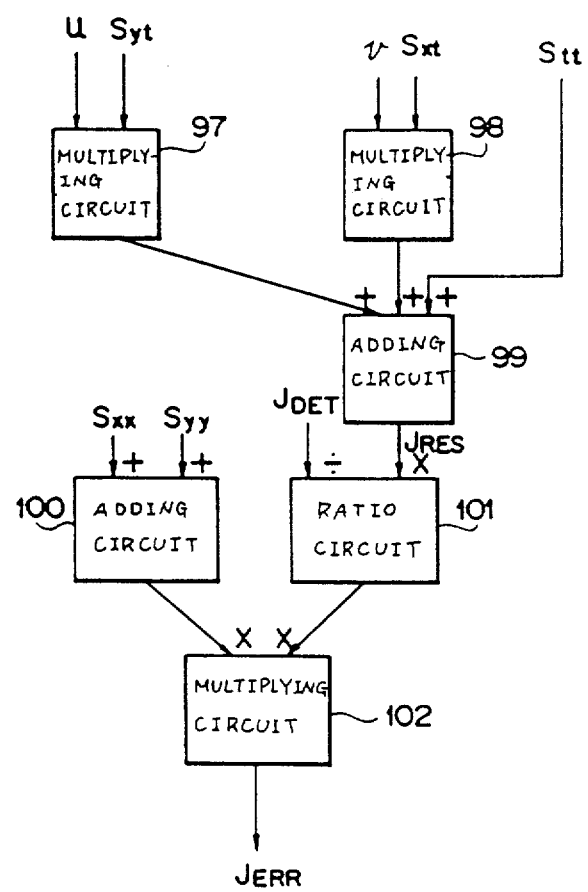
FIG. 13B is a block diagram of an example of a self-estimation computing section.

FIGS. 13A and 13B show an example of the computing section 70. This section 70 is composed of a velocity-distribution computing section 70a shown in FIG. 13A and a self-estimation computing section 70b shown in FIG. 13B.

① Velocity-distribution computing section 70a

Referring to FIG. 13A, this section 70a picks up image data from two successive frames of the image pickup camera 61 and forms differentiated images fx, fy and ft in real time. Namely, the input image f is delivered to an X-differentiation circuit 71, a Y-differentiation circuit 72 and a T-differentiation circuit 73 which are adapted to produce, respectively, spatio-temporal derivative images fx, fy and ft. These images fx, fy and ft are squared by square circuits 74, 76 and 79, respectively, and are multiplied with one another in multiplying circuits 75, 77 and 78. In consequence, auto/cross product images $fx^2$, fxfy, $fy^2$, fxft, fyft, and $ft^2$ are output from the respective circuits 74 to 79. These auto/cross product images $fx^2$, fxfy, $fy^2$, fxft, fyft, and $ft^2$ are input to smoothing circuits 80 to 85 connected to the outputs of the respective circuits 74 to 79. The smoothing circuits 80 to 85 produce moving averaged images $S_{xx}$, $S_{xy}$, $S_{yy}$, $S_{xt}$, $S_{yt}$, and $S_{tt}$. The moving averaged images $S_{xx}$, $S_{xy}$, $S_{yy}$, $S_{xt}$, $S_{yt}$, and $S_{tt}$ correspond to the integrated values in predetermined vicinity size $\Gamma$. The area or size of the region over which the integration is conducted is changed in accordance with a vicinity size control signal which is computed and determined by the self-decision/control logic section 90 which will be described later.

The outputs $S_{xx}$ and $S_{yy}$ from the smoothing circuits 80 and 82 are delivered to a multiplying circuit 86 which produces the product $S_{xx}S_{yy}$ and delivers the same to a difference circuit 92. The output $S_{xy}$ from the smoothing circuit 81 is input to a square circuit 87 which produces the square $S_{xy}^2$ and delivers the same to the difference circuit 92. Upon receipt of these two signals, the difference circuit 92 computes the difference in accordance with the following formula (2.15), thereby to determine the self-estimation value $J_{DET}$.

$$S_{xx}S_{yy}-S_{xy}^2=J_{DET} \quad (2.15)$$

This formula (2.15) corresponds to the formula (2.6) mentioned before.

The outputs $S_{xx}$ and $S_{yt}$ of the smoothing circuits 80 and 84 are delivered to the multiplying circuit 88 which in turn delivers the product $S_{xx}S_{yt}$ to a difference circuit 93. On the other hand, the outputs $S_{xy}$ and $S_{xt}$ of the smoothing circuits 81 and 83 are delivered to the multiplying circuit 89 which in turn delivers the product $S_{xx}S_{yt}$ to the difference circuit 93. The difference circuit 93, therefore, conducts computation in accordance with the following formula, using these input signals $S_{xx}S_{yt}$ and $S_{xy}S_{xt}$.

$$S_{xy}S_{xt}-S_{xx}S_{yt} \quad (2.16)$$

The output $J_{DET}$ of the difference circuit 92 and the output $S_{xy}S_{xt}-S_{xx}S_{yt}$ from the difference circuit 93 are delivered to a ratio circuit 95 which computes the ratio in accordance with the following formula (2.17):

$$\frac{S_{xy}S_{xt} - S_{xx}S_{yt}}{J_{DET}} = u \quad (2.17)$$

where u represents the velocity vector.

On the other hand, the outputs $S_{yy}$ and $S_{xt}$ of the smoothing circuits 82 and 83 are delivered to a multiplying circuit 90, the output $S_{yy}S_{xt}$ of which is delivered to a difference circuit 94. Meanwhile, the outputs $S_{xy}$ and $S_{yt}$ of the smoothing circuits 81 and 84 are delivered to a multiplying circuit 91, the output $S_{xy}S_{yt}$ of which is delivered to the difference circuit 94. The difference circuit computes the difference between these inputs $S_{yy}S_{xt}$ and $S_{xy}S_{yt}$ in accordance with the following formula (2.18).

$$S_{xy}S_{yt} - S_{yy}S_{xt} \quad (2.18)$$

The output $J_{DET}$ of the difference circuit 92 and the output $S_{xy}S_{yt} - S_{yy}S_{yt}$ of the difference circuit 94 are delivered to a ratio circuit 96 which computes the ratio between these two inputs in accordance with the following formula (2.19):

$$\frac{S_{xy}S_{yt} - S_{yy}S_{xt}}{J_{DET}} = v \quad (2.19)$$

where v represents the velocity vector.

Figure 14:
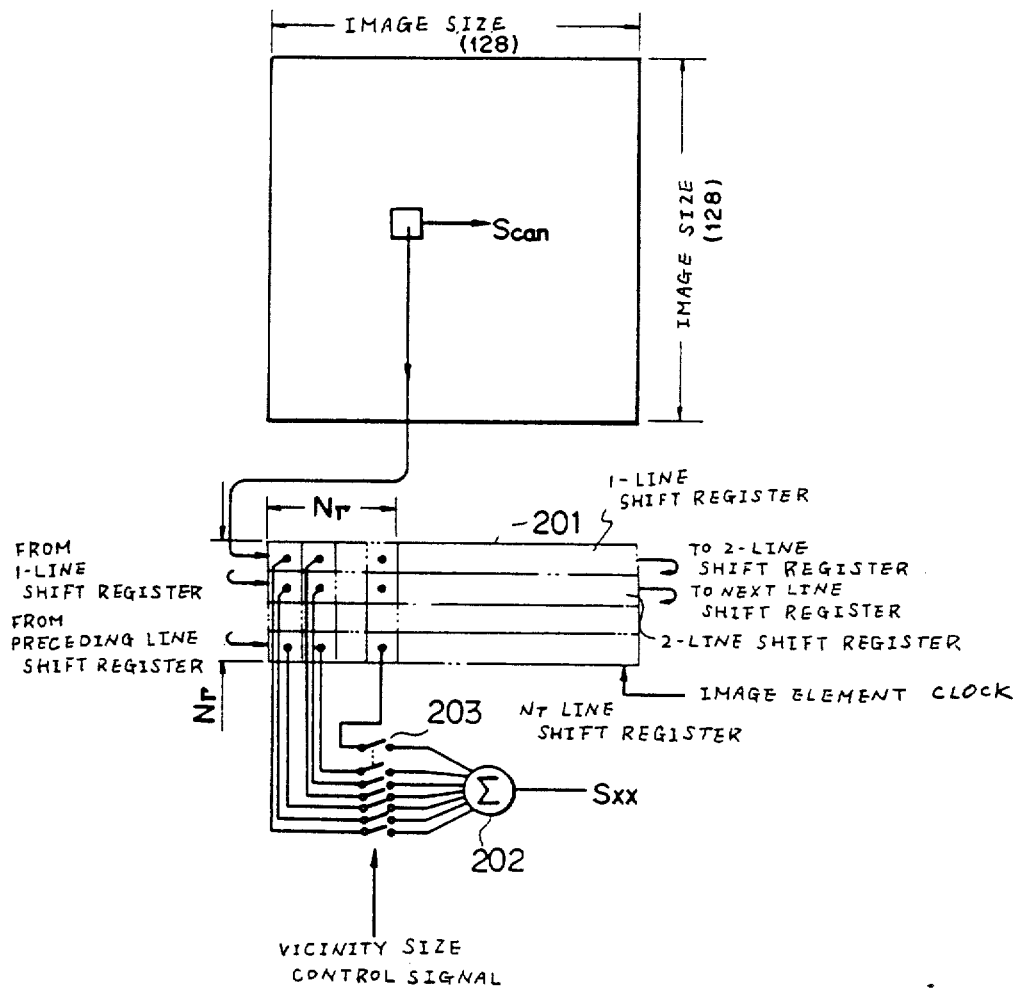

FIG. 14 shows an example of the smoothing circuits 80 to 85. The smoothing circuit 80 for the image $S_{xx}$ will be described by way of example.

The smoothing circuit 80 has a group of shift registers arranged in $N_\Gamma$ stages, an adder 202 and a group of switches 203 through which the regions $N_\Gamma \times N_\Gamma$ of the shift registers are connected to the adder 202. The arrangement is such that the group 201 of shift registers successively receive data as the image $S_{xx}$ is scanned. Assuming here that the vicinity size is set at $N_\Gamma \times N_\Gamma$ in accordance with the control signal, all the switches of the switch group 203 are turned on, so that the data in the $N_\Gamma \times N_\Gamma$ region of the shift registers are added in the adder 202, thus forming the output from the smoothing circuit 80. Similarly, if the vicinity size is set at 5×5, the switches of the switch group 203 are turned on and off, correspondingly, so that the data from the 5×5 region of the shift register group 201 are added in the adder 202 so as to form the output of the smoothing circuit 80.

② Self-estimation value computing section 70b

Referring to FIG. 13B, this section 70b is connected to the computing section 70a and is adapted to compute the self-estimation value $J_{ERR}$.

The velocity vector u and the moving averaged image $S_{yt}$ are input to a multiplying circuit 97 which is adapted for outputting the product $u \times S_{yt}$. On the other hand, the velocity vector v and the moving averaged image $S_{xt}$ are input to a multiplying circuit 98 which is adapted for outputting the product $v \times S_{xt}$. The outputs $u \times S_{yt}$ and $v \times S_{xt}$ from the multiplying circuits 97 and 98 and the moving averaged image $S_{tt}$ from the computing section 70a are delivered to an adder circuit 99 which conducts the following computation so as to determine the self-estimation value $J_{RES}$.

$$u \times S_{yt} + v \times S_{xt} + S_{tt} = J_{RES} \quad (2.20)$$

The adder circuit 99 then outputs this self-estimation value $J_{RES}$ to a ratio circuit 101 which also receives the self-estimation value $J_{DET}$ determined by the computing section 70a mentioned before so that it computes the ratio $J_{RES}/J_{DET}$, the result of which is delivered to a multiplying circuit 102 of the next stage. An adder circuit 100 receives the moving averaged images $S_{xx}$ and $S_{yy}$ from the computing section 70a and computes the sum $S_{xx}+S_{yy}$ and delivers the result to the multiplying circuit 102. Upon receipt of these two input signals, the multiplying circuit 102 conducts the following computation so as to determine the self-estimation value $J_{ERR}$.

$$\frac{J_{RES}}{J_{DET}} \times (S_{xx} + S_{yy}) = J_{ERR} \quad (2.21)$$

The formula (2.21) corresponds to the formula (2.9) mentioned before.

Figure 15:
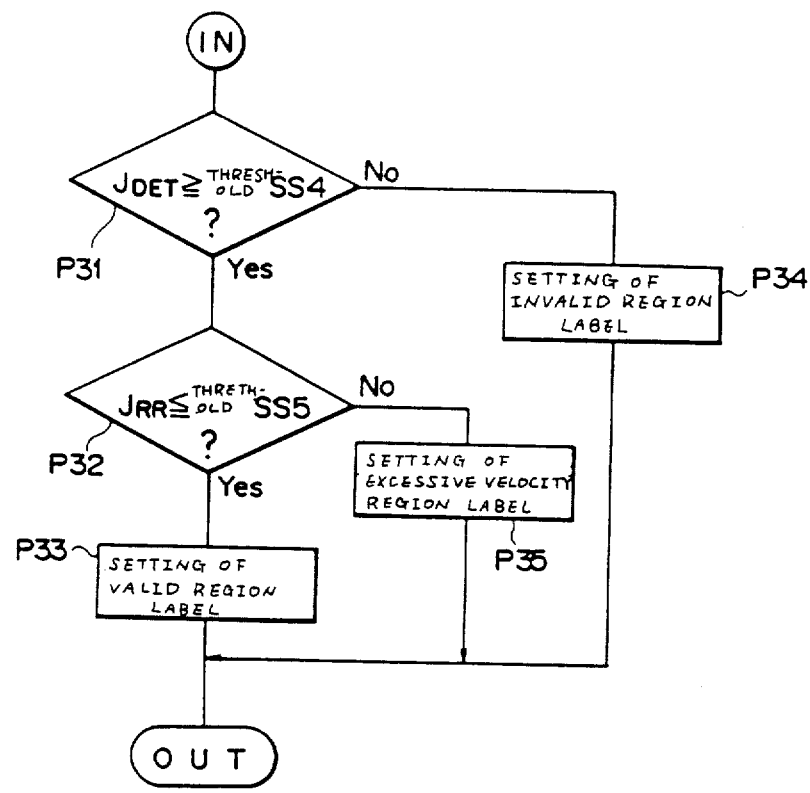

The velocity distribution data sorting section 80 will be described hereinunder with specific reference to FIG. 15. This section 80 is realized in the form of a software, and is adapted for conducting sorting for each vicinity size on each of the 128×128 pixels in accordance with the self-estimation values $J_{DET}$ and $J_{ERR}$ input thereto.

In Step P 31, the self-estimation value $J_{DET}$ from the computing section 70a of the preceding stage is compared with a predetermined threshold SS4. The process proceeds to Step P 32 if the condition of $J_{DET} \geq SS4$ is met. In Step P 32, the self-estimation value $J_{ERR}$ from the computing section 70b is compared with a predetermined threshold SS5. If the condition of $J_{ERR} \leq SS5$ is met, the process proceeds to Step P 33 in which a label indicative of valid region is given to the central pixel of the vicinity size which is the object of computation of the self-estimation value $J_{ERR}$.

If the answer given to the question in Step P 31 is "NO", a label indicative of invalid region is given to the central pixel of the above-mentioned vicinity size in Step P 34. Similarly, if the answer in Step P 32 is "NO", a label indicative of excessive velocity region is given.

These sorting maps are delivered to the self-decision/control-logic section 90 constituting the next stage.

Figure 16:
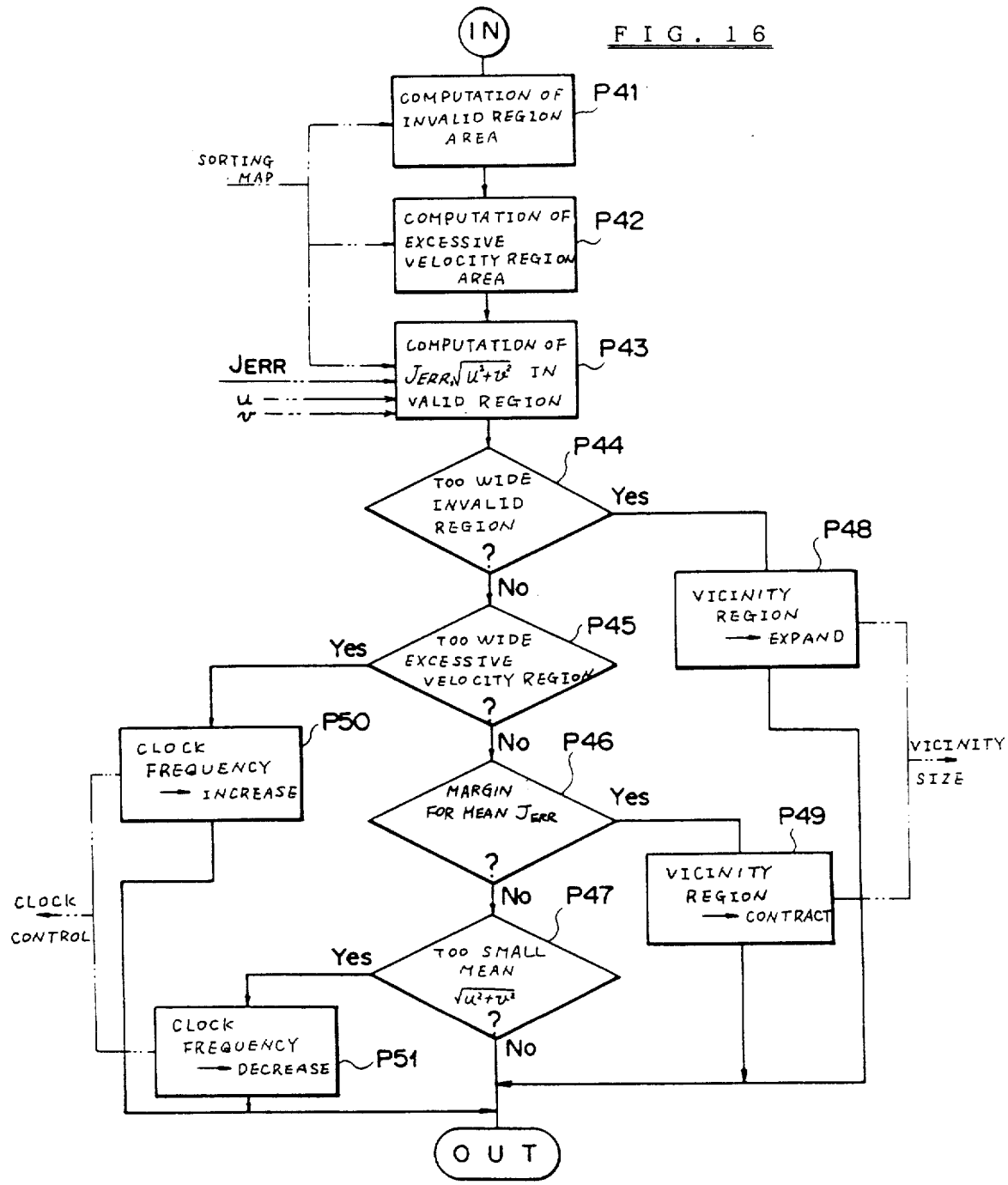

FIG. 16 shows the self-decision/control-logic section 90 realized in the form of a software. The self-decision/control-logic section 90 conducts later-mentioned operation in accordance with the sorting maps input thereto, thereby effecting control concerning the expansion or contraction of the vicinity size and increase or decrease of the clock frequency which corresponds to the frame interval of the camera 61.

In Step P 41, the area of the invalid region is computed, while the area of the excessive velocity region is computed in Step P 42.

In Step P 43, the mean value of the self-estimation value $J_{ERR}$ and the mean value of $\sqrt{u^2+v^2}$ are computed. Subsequently, in Step P 44, a judgment is conducted as to whether there is excessive area of the invalid region. If the answer is "YES", the process proceeds to Step P 48 in which the vicinity size control signal (signal for determining the area of integration performed by the smoothing circuits 80 to 85 shown in FIG. 13A) is altered so as to increase the size of the vicinity region. Conversely, if the answer "NO" is given in Step P 44, the process proceeds to Step P 45 in which a judgment is conducted as to whether there is excessive area of the excessive velocity region. If an answer "YES" is obtained, the process proceeds to Step P 50 in which the clock frequency is increased so as to shorten the frame interval.

If the answer to the question posed in Step P 45 is "NO", the process proceeds to Step P 46 in which a judgment id conducted as to whether there is a margin for the mean $J_{ERR}$. If the answer is "YES", the process proceeds to Step P 49 in which the vicinity size control signal is altered so as to reduce the vicinity size. If "NO" is the answer, a judgment is conducted in Step P 47 as to whether $\sqrt{u^2+v^2}$ is too small or not. If the answer is "YES", the process proceeds to Step P 51 in which clock frequency is reduced so as to elongate the frame interval. However, if the answer is "NO", this series of operation is ceased.

Figure 17A:
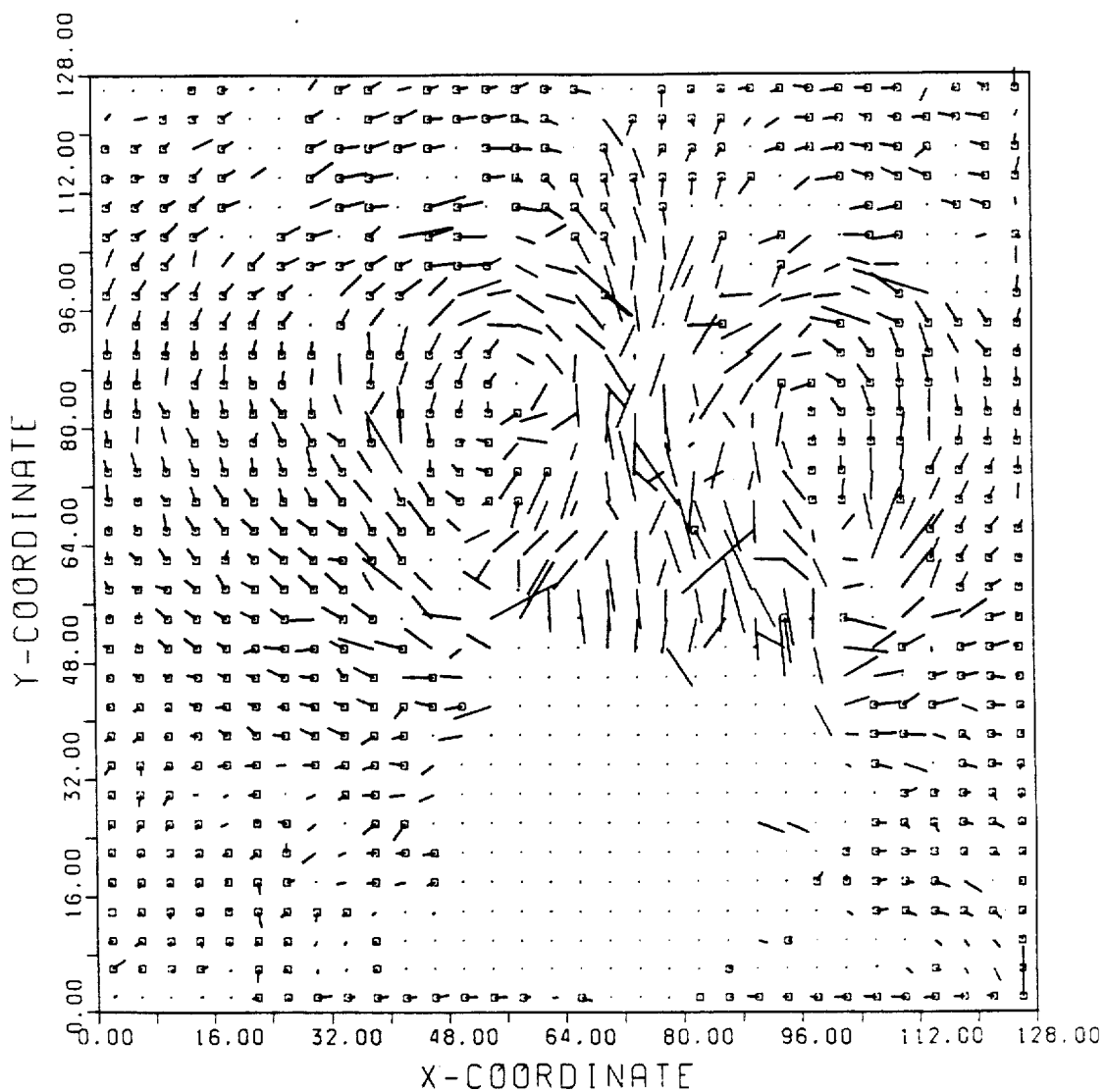
Figure 17B:
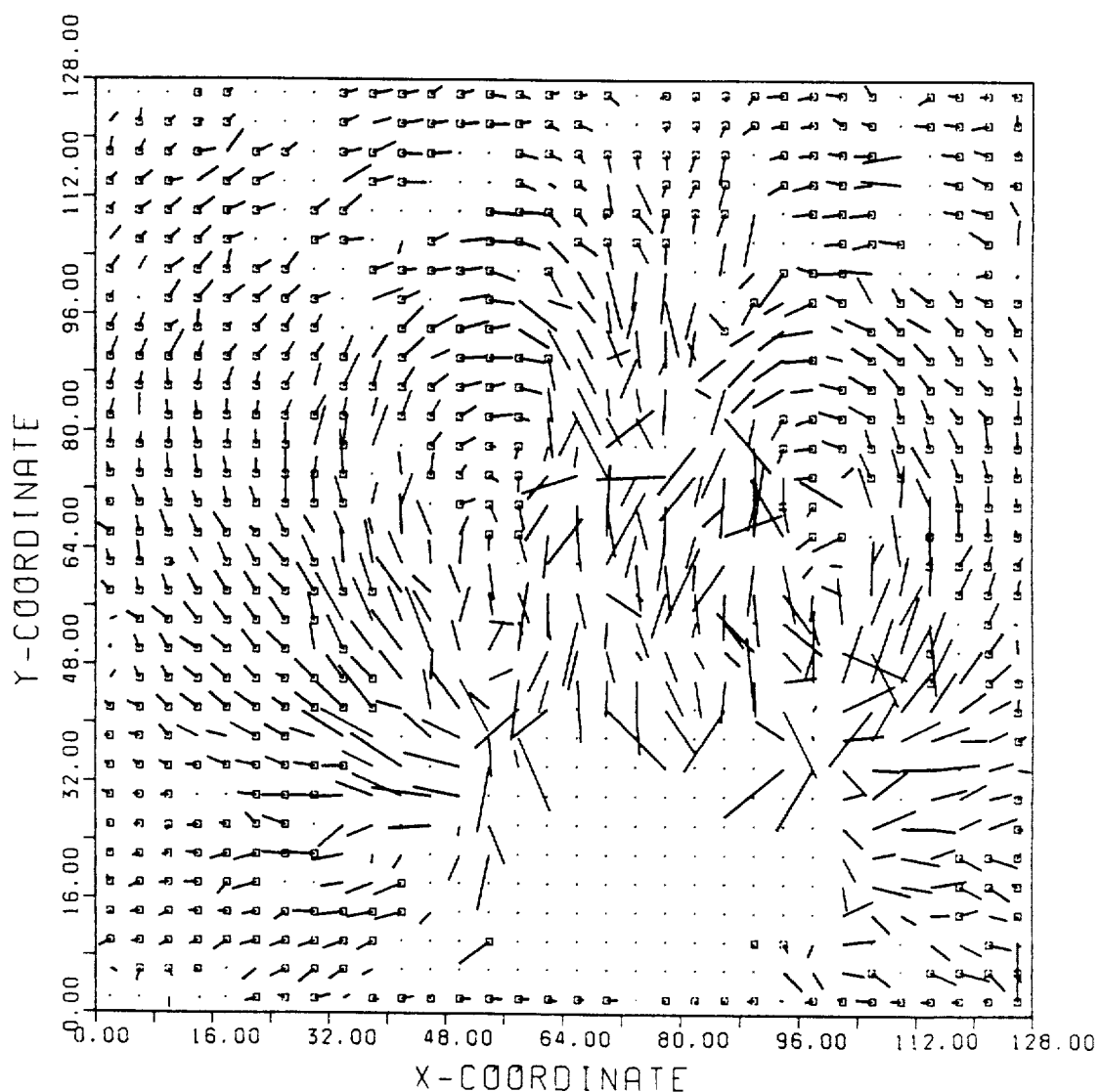
Figure 17C:
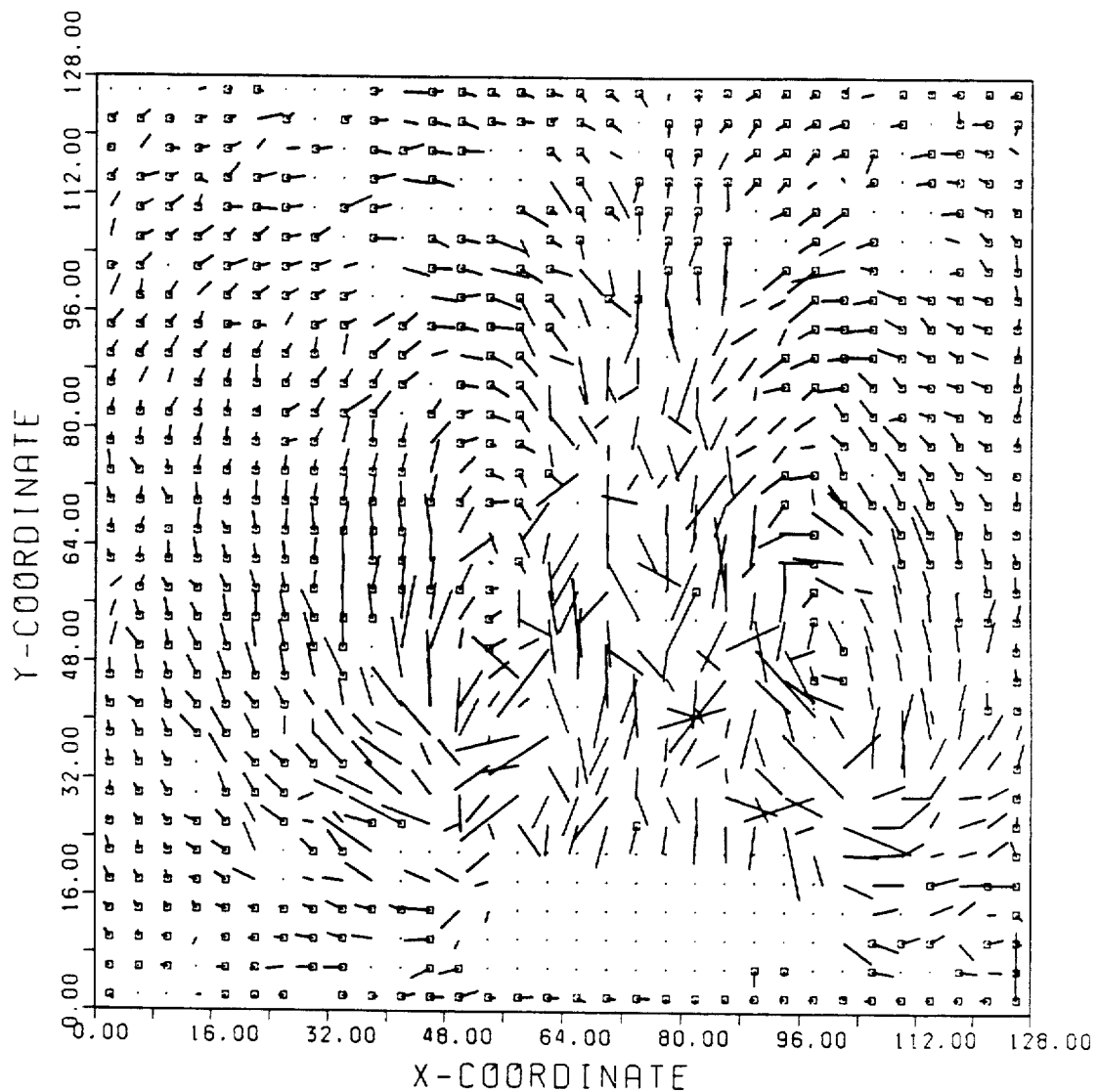

FIGS. 17A to 17C show the result of real-time measurement of a flow-velocity distribution of a fluid in accordance with this embodiment.

Powder of China ink was mixed in water and powdered aluminum was made to float on the mixture. A flat plate was partly immersed in the water mixture and moved in parallel with the water surface. Eddy currents or vortices are easily observed on the trailing side of the plate. The pattern of these vortices was measured in real time as the velocity vector distribution. The values of velocities u and u and the estimation values $J_{DET}$ and $J_{ERR}$ obtained on 32×32 grid points were stored in an extended region of the computer at an interval of 0.15 second and the result of a series of arithmetic operation with these inputs was displayed. The display may be conducted in real time but the measuring time interval is impractically prolonged in such a case. In FIGS. 17A to 17C, the marks with small squares show the regions where the measurement was effected correctly due to moderate velocity range, while the lines with no square indicate the region in which the measurement was not conducted correctly due to excessive velocity, though the object had patterns to allow the measurement. The marks or dots without any square and line indicate the region where the object has no pattern and, hence, the measurement was impossible. The white blank area on the lower portion of each Figure corresponds to the position of the flat plate. It will be seen that the flat plate is moved from the upper side to the lower side of these Figures, while causing vortices to be generated on the trailing side thereof. It will also be seen that the velocity is excessive or non-uniform in the regions near the center of each vortex.

Figure 17D:
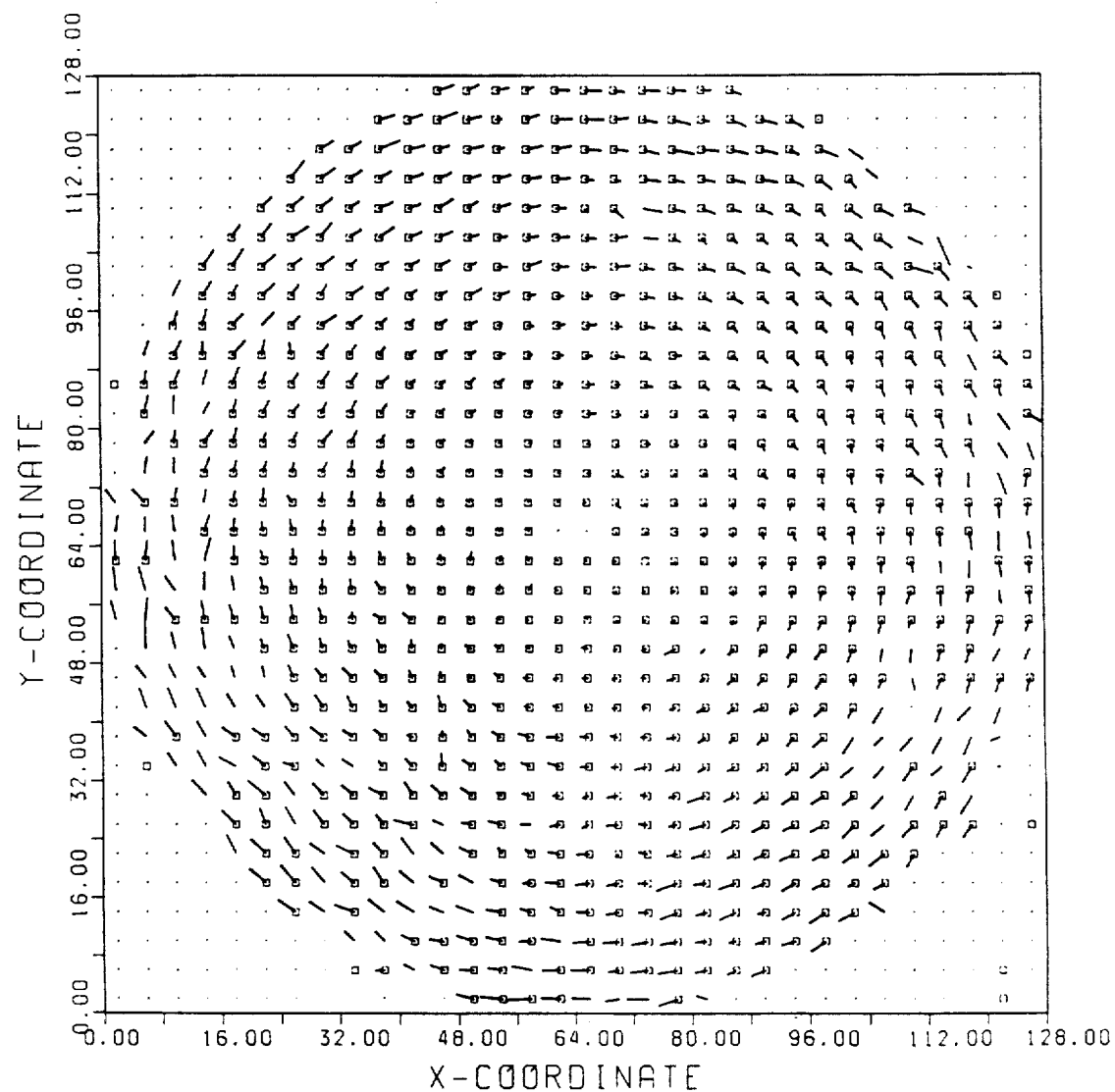
Figure 17E:
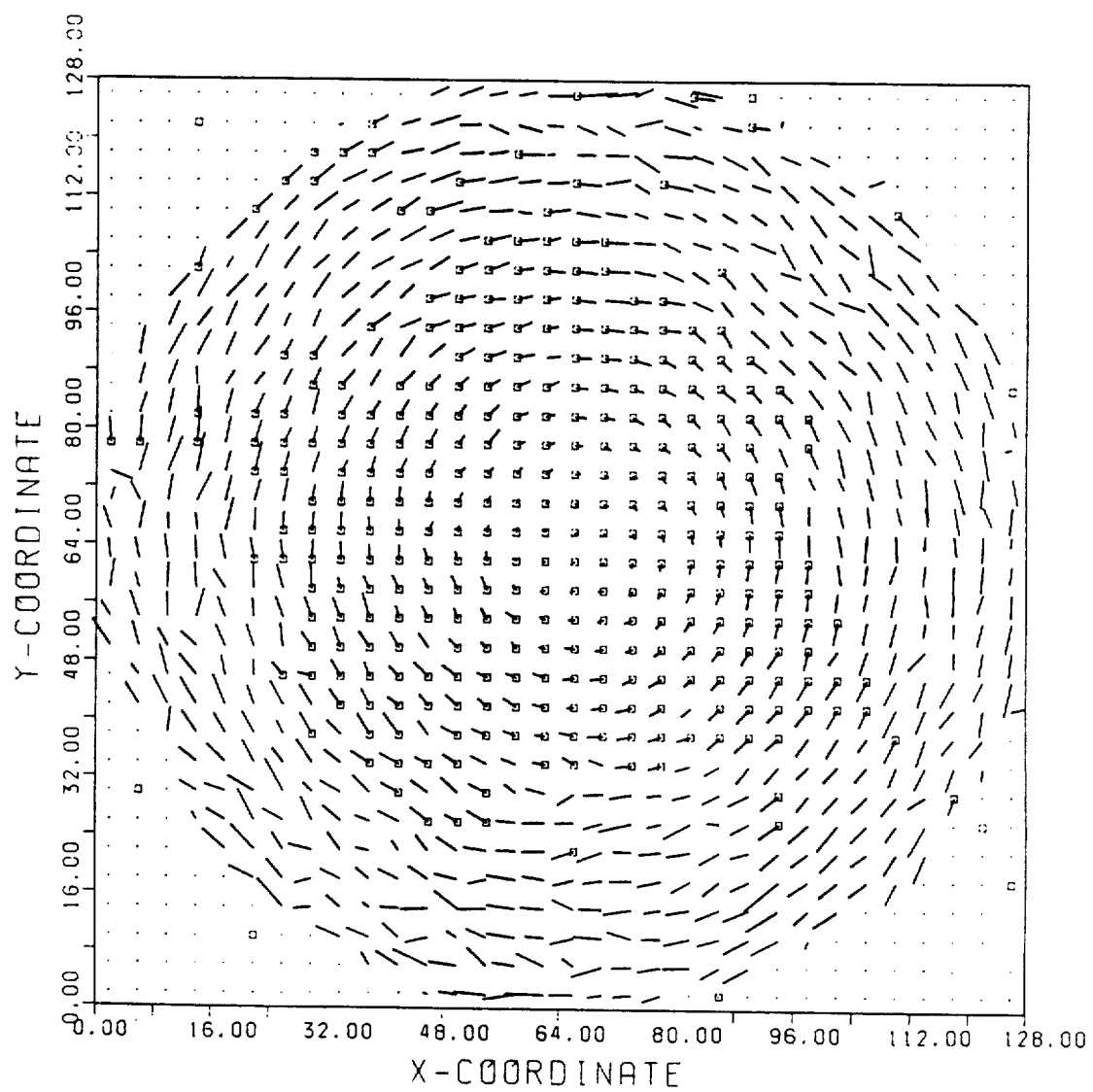
Figure 17F:
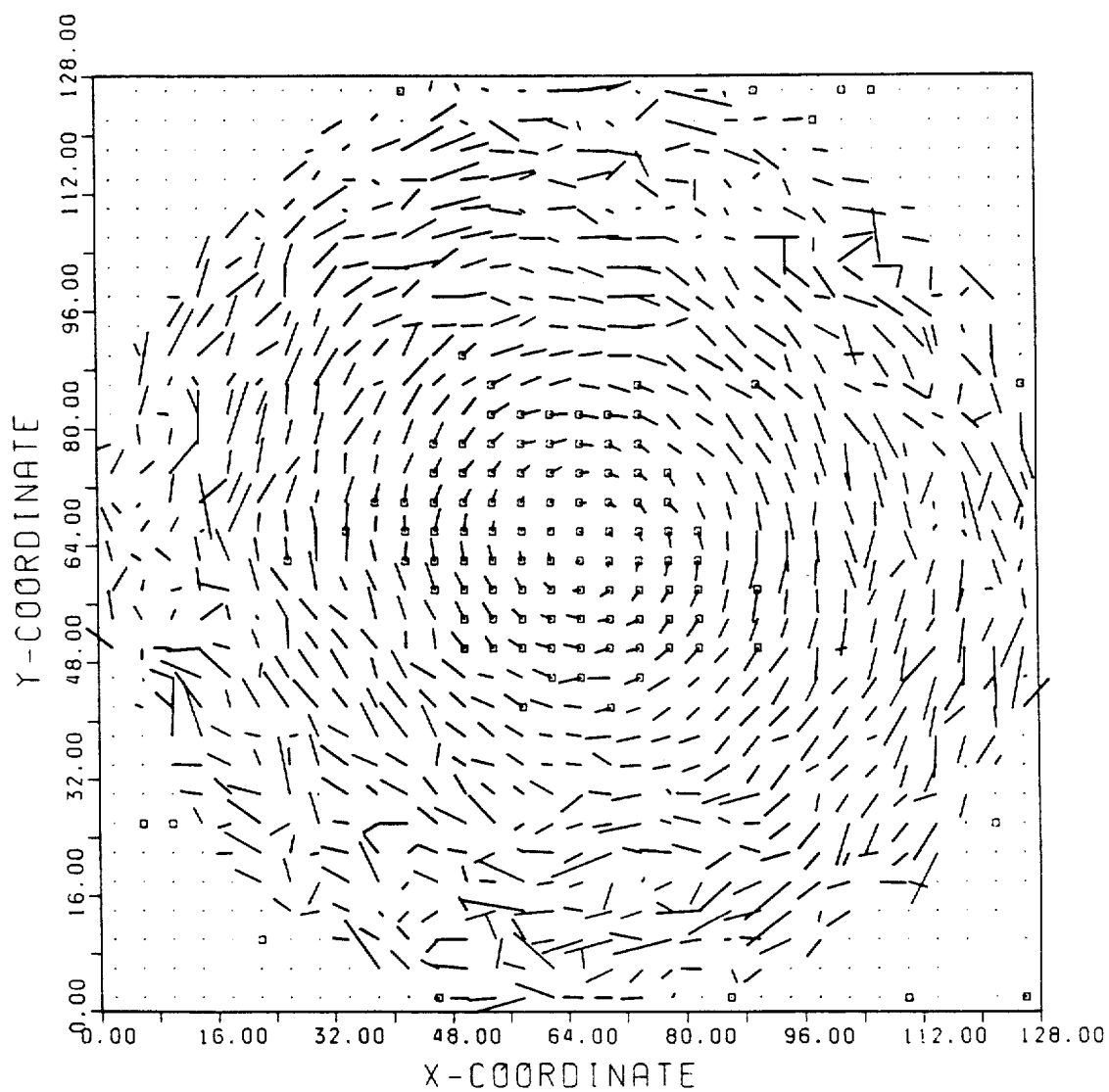

FIGS. 17D to 17F shows the result of another experiment which was conducted by employing, as the measuring object, a white disk of 32 cm dia. carried by a rotary shaft and provided with random black dots of several millimeters dia. sprayed thereto. The disk was rotated at a reduced speed of 0.0833 revolution per second through a gear head, and three different frequencies of the camera clock, i.e., 0.25 MHz, 0.5 MHz and 1 MHz, were employed to generate image deviations equivalent to three different speeds of movement of the object. These clock frequencies correspond, respectively, to frame intervals of about 68 ms, 34 ms and 17 ms, respectively. The greatest amounts of deviation between the successive frames appearing on the peripheral edge of the disk were 2.27, 1.14 and 0.57 in terms of number of pixels, respectively. The intensity of illumination was varied to compensate for any change in the sensitivity attributable to the variation in the frame interval. Images from two frames which are essentially adjacent to each other, each image including 8 bits, are picked up successively and differentiated images are formed in real time by means of a digital hardware. Due to a reason concerning the mechanism, the trailing frame is utilized for the purpose of formation of the spatially-differentiated image, while the leading frame is utilized only for time-differentiation. In order to avoid inclusion of spatial anisotropy in the spatial differentiation, the present embodiment employs a method known as central difference method. In this experiment, a vicinity size of 5×5 in terms of number of pixels was mainly used for the purpose of smoothing, and 32×32 samples were used while allowing overlap of one pixel between each adjacent vicinity regions. Since this operation is followed by a serial processing, this thinning operation contributes remarkably to an increase in the speed of processing. In this embodiment, the processing speed also is increased by the use of a hardware which is capable of simultaneously computing the aformentioned six sums of squares.

The final output is four 32×32 matrices which includes the velocity components u and v, estimation value $J_{DET}$ indicative of possibility of detection, and the estimation value $J_{ERR}$ indicative of measurement error. In this embodiment, the time taken from the moment of pickup of pixels and the moment of final output is about 0.15 second.

FIGS. 17D to 17F show the results of measurement formed by plotting, as obtained with the frame intervals of 17 ms, 34 ms and 68 ms, respectively. The direction and length of each short line indicates the velocity vector (u, v) at each point (the end of line directs downstream side of the flow of fluid), while the presence of small squares indicates that the estimation value $J_{ERR}$ of error falls within a predetermined limit. The limit value for the former is set at 0.25 (pixel length/frame interval)$^2$, the limit value for the later is set at 64 (brightness quantitization unit)$^2$. It will be seen that the measurement result shown in FIG. 17D shows almost correct velocity distribution over the entire area of the disk, whereas incorrect velocity distribution becomes remarkable from the peripheral regions where the velocity is large, in the measurement results shown in FIG. 17E and 17F. It will also be seen that the area in which the estimated error $J_{ERR}$ is below the limit is narrowed in the measuring result shown in FIGS. 17E and 17F.

As will be understood from the foregoing description of the result of experiment, the method of this embodiment enables the area on the object into three types of region by making use of the self-estimation values $J_{ERR}$ and $J_{DET}$; namely, (1) the region where the velocity falls in adequate range so that measurement was conducted correctly, (2) the region where the measurement was not conducted correctly due to excessive velocity though the object had a pattern which enabled measurement, and (3) the region in which the object had no pattern and, hence, the measurement was impossible. These three types of regions are shown, respectively, by (1) short lines with squared, (2) short lines alone and (3) central dots alone. It is expected that, when the region (2) of excessive velocity is large, the detectable area will be increased by introduction of such a dynamic control as to shorten the frame interval.

It is also possible to synthesize the data shown in FIGS. 17D to 17F by inputting the velocity vector map and the error map to the synthesizing section 110 which is shown by broken line in FIG. 12. Such a synthesizing operation is effective particularly in the case where a steady pattern moves as in the case of movement of clouds as viewed from a satellite.

As will be understood from the foregoing description, the detection of moving picture in accordance with the second embodiment of the invention is carried out by executing the following steps.

(1) To form three types of images (differentiated images) constituted by pixel values which are obtained by spatial differentiation and time differentiation which are conducted by making use of images derived from two successive frames of a predetermined interval.

(2) To form five types of images constituted by pixel values which are the products of these three types of images.

(3) To obtain smoothed product images by smoothing these five types of images by means of dot-dispersion function in the vicinity region $\Gamma$ of a predetermined size.

(4) To compute two kinds of ratio of sums of squares of the smoothed images.

These steps of operation can be carried out by means of a multi-stage parallel computing circuit as shown in FIGS. 13A and 13B, so that the moving image can be extracted in real time. The step (4) mentioned above may be further decomposed into sub-steps.

In addition, a judgment is conducted including evaluation of validity of the detected moving image data, by making use of self-estimation values $J_{DET}$ and $J_{ERR}$ obtained in the course of detection of the moving image. Then, a control is conducted such as to increase or decrease the frame interval and/or to expand or contract the vicinity size in accordance with the result of judgment, thereby converging the measuring conditions to the optimum region. It is thus possible to obtain a moving image processing method which makes use of spatio-temporal derivative method which enables a moving object to be measured without being interfered by noises and which enables the measuring range of velocity of the moving object in accordance with the state of measurement.

Third Embodiment

Figure 18:
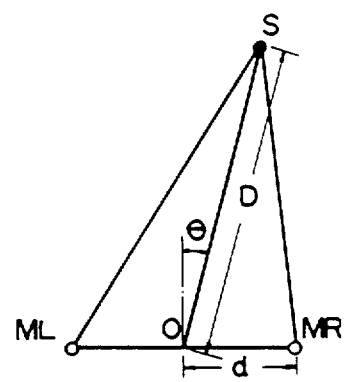

Referring to FIG. 18, a source of sound is indicated at S, while left and right microphones, which are spaced by an equal distance d from the center O are represented by ML and MR. The angle formed between a vertical line passing through the center O and a line interconnecting the sound source S and the center O is represented by $\theta$, while the distance between the sound source S and the center O is indicated by D. Acoustic signals received by the microphones ML and MR are represented by $f_L(t)$ and $f_R(t)$, while the imaginary signal at the center O is represented by $f_0(t)$.

The acoustic signals $f_L(t)$ and $f_R(t)$ are then expressed by the following formulae:

$$f_L(t) = f_0(t - \tau) \tag{3.1}$$
$$f_R(t) = f_0(t + \tau) \tag{3.2}$$

where $\tau$ indicates the time difference between the acoustic signals $f_L(t)$ and $f_R(t)$. Assuming here that the time difference $\tau$ is sufficiently small, the following conditions are derived by conducting Taylor development of the formulae (3.1) and (3.2) and approximation by the term of first order:

$$f_L(t) = f_0(t) - \tau \dot{f}_0(t) \tag{3.3}$$
$$f_R(t) = f_0(t) - \tau \dot{f}_0(t) \tag{3.4}$$

-continued $$\dot{f}_0(t) \overset{\Delta}{=} \frac{d}{dt} f_0(t)$$

In consequence, a sum signal $f_{R+L}(t)$ and a difference signal $f_{R-L}(t)$ are given as follows, respectively.

$$f_{R+L}(t) \overset{\Delta}{=} f_R(t) + f_L(t) \approx 2 f_0(t) \tag{3.5}$$

$$f_{R-L}(t) \overset{\Delta}{=} f_R(t) - f_L(t) \approx 2 \dot{f}_0(t) \tag{3.6}$$

Therefore, the time difference $\tau$ is given as follows.

$$\tau = \frac{f_{R-L}(t)}{\dot{f}_{R+L}(t)} \tag{3.7}$$

In determining the time difference $\tau$ by the spatio-temporal derivative method, it is necessary to reduce the number of computing steps so as to exclude influence of noises as much as possible. In this embodiment, therefore, it is assumed that the time difference $\tau$ is constant within a given time $t_1$ to $t_m$, and solution is stabilized by the use of the least squares method.

Namely, the time difference $\tau_1$ to be obtained is determined in accordance with the following formula (3.9) which is the least squares solution to the equation (3.8) mentioned below.

$$J = \int_{t_1}^{t_m} \{f_{R-L}(t) - \tau \dot{f}_{R+L}(t)\}^2 dt \tag{3.8}$$

$$\tau 1 = \frac{\int_{t_1}^{t_m} f_{R-L}(t) \dot{f}_{R+L}(t) dt}{\int_{t_1}^{t_m} \{\dot{f}_{R+L}(t)\}^2 dt} \tag{3.9}$$

In order that the formula (3.9) is solved stably, it is necessary that the denominator of the formula (3.9) is sufficiently larger than 0 (zero).

The criterion function J in formula (3.8) is written as follows under the optimum condition.

$$J_{RES} = \frac{\{\int f_{R-L}(t) \dot{f}_{R+L}(t) dt\}^2}{\int \{\dot{f}_{R+L}(t)\}^2 dt} = \int \{f_{R-L}(t)\}^2 dt \tag{3.10}$$

The value of this formula represents the residual error and, hence, can be used as a criterion for judgment of, for example, levels of noises included in the acoustic signals.

A detailed description will be made hereinunder as to a practical example of the third embodiment, with reference to FIGS. 19 to 21.

Figure 19:
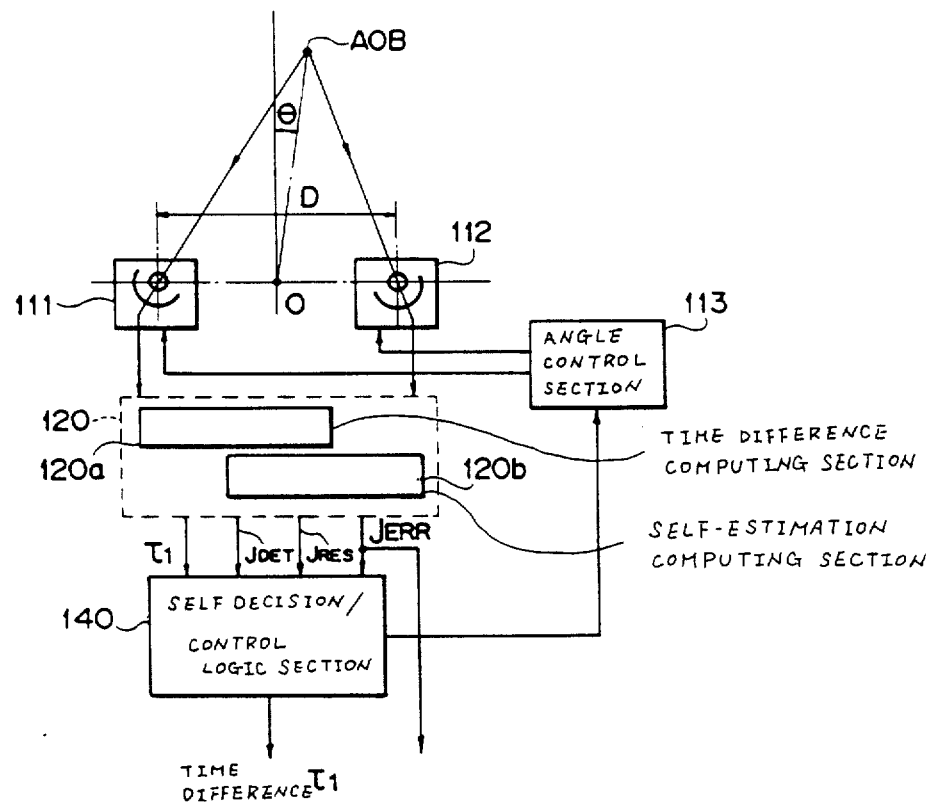

Referring first to FIG. 19, a pair of microphones 111 and 112 are disposed to oppose a sound source AOB as the measuring object at direction angle $\theta$. The direction angle $\theta$ can be controlled by means of an angle control section 113. The acoustic signals received by both microphones 111 and 112 are input to time-difference/self-estimation computing section 120 which in turn computes the time difference $\tau 1$, as well as self-estimation values $J_{DET}$, $J_{ERR}$ and $J_{RES}$. Signals indicative of these values are received by the self-estimation/control logic section 140 in which the computation performed in the computing section 120 is evaluated by the self-estimation values $J_{DET}$ and $J_{ERR}$. When the computation in the section 120 is judged as being below a predetermined criterion, the direction angle $\theta$ is controlled so as to increase the resolution, thereby enabling the computation in the section 120 to reach the predetermined criterion. The time difference $\tau 1$ obtained in this state is output as the final data.

The time-difference/self-estimation computing section 120 will be described hereinunder with specific reference to FIG. 20.

The signals $f_L(t)$ and $f_R(t)$ from the microphones 111 and 112 are delivered to amplifiers 131 and 132, respectively. The outputs of these amplifiers 131 and 132 are then input to a subtracting device 133 and an adder 134, respectively. The subtracting device 133 delivers a difference signal $f_{R-L}(t)$, while the adder 134 delivers a sum signal $f_{R+L}(t)$. The sum signal $f_{R+L}(t)$ is input to a differentiation circuit 135 having a capacitor C1, whereby a differentiated value $\dot{f}_{R+L}(t)$ is obtained. Meanwhile, the difference signals $f_{R-L}(t)$ is input to a sum/division circuit 136 so that a mean value $f_{R-L}(t)$ is computed.

The differentiated value $\dot{f}_{R+L}(t)$ is delivered to a square circuit 137 which delivers the square $\{\dot{f}_{R+L}(t)\}^2$ to an integration circuit 140. The integration circuit 140 then delivers an integrated value $\int\{\dot{f}_{R+L}(t)\}^2 dt = S_{tt}$ as the self estimation value $J_{DET}$ and delivers the same to a ratio circuit 143. The multiplication circuit 138 receives signals $\dot{f}_{R+L}(t)$ and $f_{R-L}(t)$ so that the product $\dot{f}_{R+L}(t)f_{R-L}(t)$ is output therefrom and delivered to an integration circuit 141. The integration circuit 141 computes $\int \dot{f}_{R+L}(t)f_{R-L}(t)dt = S_{td}$ and the output signal $S_{td}$ is input to a ratio circuit 143 and a multiplying circuit 144. Therefore, the ratio circuit 143 conducts the following computation and delivers the time difference $\tau 1$ as the output.

$$\frac{\int \dot{f}_{R+L}(t)f_{R-L}(t)dt}{\int \{\dot{f}_{R+L}(t)\}^2 dt} = \frac{S_{td}}{S_{tt}} = \tau 1 \qquad (3.11)$$

This output signal $\tau 1$ is delivered to the multiplying circuit 144. Since the multiplying circuit 144 receives also the signal $S_{td}$, the circuit computes $S_{td}^2/S_{tt}$ and delivers the output to a difference circuit 145.

Meanwhile, the square circuit 139 outputs a signal $\{f_{R-L}(t)\}^2$ and delivers the same to the integration circuit 142 which in turn computes $\int \{f_{R-L}(t)\}^2 dt$ ($=S_{dd}$) and delivers the same to the difference circuit 145. Upon receipt of these signals, the difference circuit 145 conducts the following computation, thereby determining the self-estimation value $J_{RES}$.

$$-\frac{S_{td}^2}{S_{tt}} + S_{dd} = J_{RES} \qquad (3.12)$$

This self-estimation value $J_{RES}$ is input also to a ratio circuit 146 which also receives the signal $S_{tt}=J_{DET}$. Upon receipt of these two input signals, the ratio circuit conducts the computation in accordance with the following formula, thereby to determine the self-etimation value $J_{ERR}$.

$$\frac{J_{RES}}{J_{DET}} = J_{ERR} \qquad (3.13)$$

A description will be made hereinunder as to the self-decision/control logic section 140.

Figure 21:
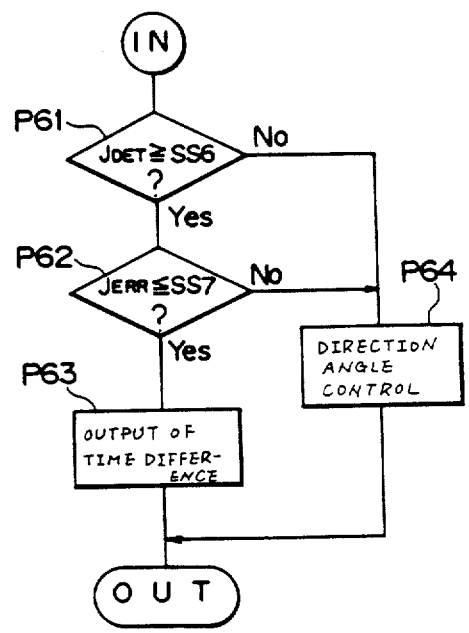

This section 140 is realized in the form of a software as shown in FIG. 21. In Step P 61, a judgment is conducted as to wether the condition of $J_{DET} \leq SS6$ (a threshold) is met. If the answer is "YES", the process proceeds to Step P62, in which a judgment as to wether $J_{ERR} \leq SS7$ is met. If the answer is "YES", the process proceeds to Step P63 in which the time difference $\tau 1$ is output. When an answer "NO" is obtained in Step P 61 or P 62, the process proceeds to Step P 64 in which the direction angle control section 113 is driven to determine the direction angle $\theta$.

It is possible to locate the sound source AOB in accordance with the thus determined time difference $\tau 1$.

Figure 20:
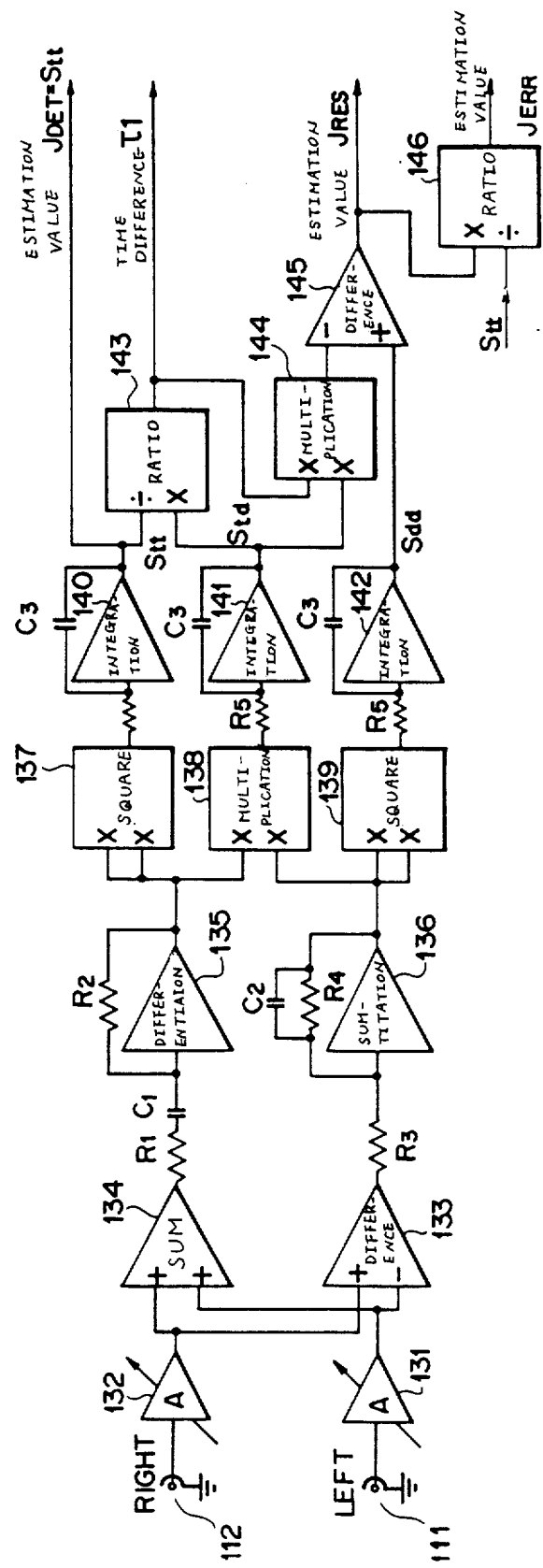

In the third embodiment described hereinbefore, it is possible to extract the time difference $\tau 1$ in real time by means of the multi-stage parallel computing circuit as shown in FIG. 20. In addition, the validity of the extracted time difference data is evaluated by making use of the self-estimation values $J_{DET}$ and $J_{ERR}$ obtained in the course of extraction, whereby only valid time difference $\tau 1$ is obtained. In consequence, data with errors such as those produced by noise is excluded, thus making it possible to extract time difference data by spatio-temporal derivative method.

Although first to third embodiments of the invention have been described, it is to be noted that the described embodiments are only illustrative and various changes and modifications may be imparted thereto. For instance, the invention can be effectively used in fluoroscopy for the purpose of separating an object from a background by spatio-temporal derivative method, as well as in various image processing operations which do not employ optical images, such as extraction of images by supersonic waves or by NMR.

What is claimed is:

1. An apparatus for measuring an object, comprising:
    sensor means for picking up signals representing data concerning an object to be measured;
    computing means for spatio-temporally differentiating said signals so as to determine physical amounts of said object and to determine self-estimation values, of a type that said physical amounts include an associated error to which said self-estimation values are proportional;
    judging means for juding the validity of the physical amounts determined by said computing means, on the basis of said self-estimation values; and
    control means for varying, in response to a judgment of any physical amount having a low validity, a measuring condition of said sensor means so as to enable said sensor means to obtain said signals again, while re-starting said computing means and said judging means.

2. A measuring apparatus according to claim 1, wherein said control means synthesizes a physical value having a high degree of validity obtained by picking up said signals for a plurality of times thereby to supply a measuring result.

3. A three-dimensional measuring apparatus for detecting a three-dimensional image of an object, comprising:

a pair of image pickup devices having optical axes which intersect each other at a point on a predetermined reference plane, said devices producing, respectively, a left image signal and a right image signal;

computing means for computing, on the basis of said left and right image signals, a sum signal representing the sum of said left and right image signals, a difference signal representing a difference between said left and right image signals and a sum differentiation signal obtained by differentiating said sum of said left and right image signals, said computing means being further adapted to determine:

(a) a relative height of each region of said object from said reference plane, said relative height including an associated error, and (b) a self-estimation value for each of said regions, said self-estimation value being proportional to said associated error and used as a criterion for judgment as to whether the determined relative height is valid as a measurement data;

judging means for judging a validity of said relative height for each of said regions on the basis of said self-estimation value; and synthesizing means for synthesizing the three-dimensional image of said object by using said relative height which have been judged by said judging means as being valid.

4. A measuring apparatus according to claim 3, further comprising:

convergence angle driving means for controlling a convergence angle formed between the optical axes of said pair of image pickup devices so as to shift said reference plane with respect to a depth of said object; and control means for activating, when said relative height of said object from said reference plane includes data of a low validity, said convergence angle driving means so as to shift said reference plane and for picking up image signals on the basis of shifted reference plane from said pair of a image pickup devices, while driving said computing means, said judging means and said synthesizing means;

whereby said three-dimensional image of said object is determined on the basis of said relative height having a high degree of validity obtained from the image signals on the basis of the respective positions of said reference plane.

5. A measuring apparatus according to claim 3, further comprising:

reference plane shifting means for electrically controlling said image signal from said pair of image pickup devices so as to shift said reference plane with respect to a depth of said object; and control means for picking up, when said relative height of said object from said reference plane includes data of a low validity, image signals from said pair of image pickup devices on the basis of shifted reference plane shifted by said reference plane shifting means, while driving said pair of image pickup devices so as to shift said reference plane with respect to a depth of said object; and control means for activating, when said relative height of said object from said reference plane includes data of a low validity, said convergence angle driving means so as to shift said reference plane and for picking up image signals on the basis of shifted reference plane from said pair of said image pickup devices, while driving said computing means, said judging means and said synthesizing means;

whereby said three-dimensional image of said object is determined on the basis of said relative height having high degree of validity obtained from the image signals on the basis of the respective positions of said reference plane.

6. A three-dimensional measuring apparatus according to claim 3, wherein said synthesizing means weights said relative height which has been judged as being valid in accordance with a degree of its validity, thereby synthesizing the three-dimensional image of said object.

7. A measuring apparatus according to claim 6, further comprising:

convergence angle driving means for controlling a convergence angle formed between the optical axes of said computing means, said judging means and said computing means;

whereby said three-dimensional image of said object is determined on the basis of said relative height having high degree of validity obtained from the image signals on the basis of the respective positions of said reference plane.

8. A measuring apparatus according to claim 6, further comprising:

reference plane shifting means for electrically controlling said image signal from said pair of image pickup devices so as to shift said reference plane with respect to a depth of said object;

control means for picking up, when said relative height of said object from said reference plane includes data of a low validity, image signals from said pair of image pickup devices on the basis of shifted reference plane shifted by said reference plane shifting means, while driving said computing means, said judging means and said computing means;

whereby said three-dimensional image of said object is determined on the basis of said relative height having high degree of validity obtained from the image signals on the basis of the respective positions of said reference plane.

9. A measuring apparatus for measuring velocity distribution of a moving object, comprising:

an image pickup device for outputting image signals for each of successive frames at a predetermined time interval;

computing means for computing a time-differentiated value of said image signals and a spatially-differentiated value of said image signals, and for computing, on the basis of said time- and spatially-differentiated values:

(a) velocity vectors of the respective regions of said moving object, said velocity vectors including an associated error, and (b) a self-estimation value for each of said regions, said self-estimation value being proportional to said associated error and used as a criterion for a judgment as to whether each of said velocity vectors determined by said computing means constitutes a valid data;

judging means for judging a validity of said velocity vectors for each of said regions on the basis of said self-estimation value; and velocity synthesizing means for synthesizing the velocity distribution of said moving object by using said velocity vectors which have been judged as being valid by said judging means.

10. A measuring apparatus according to claim 9, wherein said time-differentiated value is computed on the basis of image signals from two successive frames.

11. A measuring apparatus according to claim 10, further comprising:

frame time interval control means for varying said time interval; and driving control means for operating, when said velocity vectors obtained on the basis of the image signals at said predetermined interval includes data of a low validity, said frame time interval control means to control the time interval of said frames, and for picking up image signals by said image pickup device on the basis of new time interval, while driving said computing means, said judging means and said velocity synthesizing means;

whereby said velocity distribution of said moving object is synthesized by the velocity vectors of high validity obtained at said varied time intervals.

* * * * *